United States Patent [19]
Ninomiya et al.

[11] Patent Number: 5,703,800
[45] Date of Patent: Dec. 30, 1997

[54] SIGNAL PROCESSOR

[75] Inventors: Kazuki Ninomiya; Keizo Sumida; Jiro Miyake; Tamotsu Nishiyama, all of Osaka, Japan

[73] Assignee: Matsushita Electric Industrial Co., Ltd., Osaka, Japan

[21] Appl. No.: 545,204

[22] Filed: Oct. 19, 1995

[30] Foreign Application Priority Data

Oct. 21, 1994 [JP] Japan ................. 6-256994

[51] Int. Cl.$^6$ ........................ G06F 7/38
[52] U.S. Cl. ........................ 364/736
[58] Field of Search ................. 364/736, 200; 365/189.01; 395/505

[56] References Cited

U.S. PATENT DOCUMENTS

| | | | |
|---|---|---|---|
| 4,541,048 | 9/1985 | Propster et al. | 364/200 |
| 4,580,215 | 4/1986 | Morton | 364/200 |
| 4,594,678 | 6/1986 | Uhlenhoff | 364/736 |
| 4,739,474 | 4/1988 | Holsztynski | 364/200 |
| 4,945,506 | 7/1990 | Baji et al. | 364/736 |
| 4,970,688 | 11/1990 | Minagawa et al. | 365/189.01 |

FOREIGN PATENT DOCUMENTS

| | | |
|---|---|---|
| 59-172064 | 9/1984 | Japan . |
| 60-159973 | 8/1985 | Japan . |
| 2 247 328 | 2/1992 | United Kingdom . |
| 2 247328 | 2/1992 | United Kingdom . |
| WO 87/01841 | 3/1987 | WIPO . |

OTHER PUBLICATIONS

Stephan Olariu et al., "Time Optimal Sorting and Applications on nxn Enhanced Meshes", pp. 250–255 May 4, 1992.
Philippe Clauss et al., "Calculus of Space Optimal Mappings of Systolic Algorithms on Processor Arrays," Journal of VLSI Signal Processing, pp. 27–36 Feb. 4, 1992.
Nariankadu D. Hemkumar et al., "A Systolic VLSI Architecture for Complex SVD," pp. 1061–1064 May 10, 1992.
Christophe Joanblanq et al., "A 54–MHz CMOS Programmable Video Signal Processor for HDTV Applications", IEEE Journal of Solid-State Circuits, Jun., 1990, vol. 25, No. 3, pp. 730–734.

Primary Examiner—Reba I. Elmore
Assistant Examiner—Monica Lewis
Attorney, Agent, or Firm—McDermott, Will & Emery

[57] ABSTRACT

An improved signal processor is disclosed which is suitable for convergence processing of images that achieves parallel processing with a smaller bus structure. An arithmetic array is provided which is formed of ten arithmetic cells capable of concurrently operating. Each arithmetic cell is specified by a denotation of E[(column number),y(row number)] where the column number x is $1 \leq x \leq 4$ and the row number y is $x \leq y \leq 4$. Each arithmetic cell has a multiplier and an adder for multiply-add operation. An arithmetic cell, specified by E[x,y] where $2 \leq x \leq 4$ and $x \leq y \leq 4$, receives data from an E[x−1,y] arithmetic cell via a direct bus as well as from an E[x−1,y−1] arithmetic cell via an oblique bus. For example, when pixel data items as to four pixels horizontally arranged in an image are fed to the four arithmetic cells in the first column, the arithmetic cell in the fourth column provides a 4-tap horizontal filter operation result.

20 Claims, 23 Drawing Sheets

SIGNAL PROCESSOR

BACKGROUND OF THE INVENTION

This invention relates to a signal processor, e.g., an image processor.

In recent years, in the field of image processing of moving and still pictures, analog filters including high-pass filters and low-pass filters have been digitized. Hardware capable of performing a plurality of filter arithmetic operations is required for multimedia applications.

C. Joanblanq et al. report a programmable digital signal processor in their report entitled "A 54-MHz CMOS Programmable Video Signal Processor for HDTV Applications," IEEE Journal of Solid-State Circuits, Vol. 25, No. 3, pp. 730–734, June 1990. This signal processor is constructed by incorporating into a single chip an arithmetic unit formed by cascading a plurality of multiply-add arithmetic cells each having a multiplier and an adder. In accordance with this signal processor, for example, if a1, a2, and a3 are coefficients and an i-th input data item (pixel data) is gi, then three multiply-add arithmetic cells connected in a cascade fashion perform a 3-tap horizontal filter arithmetic operation: $a1 \times gi + a2 \times g(i+1) + a3 \times g(i+2)$.

In order to increase the rate of processing of arithmetic operations, it is necessary to operate a plurality of multiply-add arithmetic cells of the above-described type in parallel.

Japanese Patent Application, published under No. 59-172064, shows an image processor in which a great number of MPUs (microprocessor units) are placed in a two-dimensional grid arrangement corresponding to display pixels and these MPUs perform their respective image processing operations in parallel. In this image processor, an MPU and its neighboring four MPUs (in the horizontal and vertical directions) are interconnected by separate data buses.

Japanese Patent Application, published under No. 60-159973, shows an image processor in which a plurality of PEs (processor elements) and a plurality of MEs (memory elements) are provided and all the PEs and all the MEs are coupled to common buses. In this image processor, each PE is assigned a respective bus number that indicates which bus to be used for connection therewith and, likewise, each ME is assigned a respective bus number that indicates which bus to be used for connection therewith.

Filter processing is the multi-input/single output convergence processing. Therefore, when employing a filter structure such that a great number of concurrently operable multiply-add arithmetic cells are placed in a two-dimensional grid arrangement and are interconnected by data buses, this produces redundancy in the data bus structure. On the other hand, when employing a filter structure such that all multiply-add arithmetic cells capable of concurrently operating are coupled to common buses, this produces redundancy in the common bus selection control.

SUMMARY OF THE INVENTION

Accordingly, an object of the present invention is to provide a signal processor suitable for convergence processing that achieves parallel processing operations with a smaller bus structure.

This invention provides a signal processor in which a plurality of arithmetic cells capable of concurrently operating are two-dimension placed such that the arithmetic cells have a pyramid hierarchical Structure, and the arithmetic cells are interconnected so as to form a tree structure. More specifically, this signal processor includes:

(a) an arithmetic unit for performing arithmetic operations on data;

(b) a first interface for receiving external data signals and for transmitting data corresponding to the received signals to the arithmetic unit; and (c) a second interface for receiving data processed by the arithmetic unit and for providing data signals corresponding to the received data;

the arithmetic unit including:

(a-1) an array of a plurality of concurrently operable arithmetic cells arranged in columns and rows wherein each of the arithmetic cells is specified by a denotation of $E[x,y]$ where x is a column number subscript satisfying $1 \leq x \leq M$ and y is a row number subscript satisfying $x \leq y \leq M$, M being an integer such that $M \geq 2$;

wherein:

(i) an arithmetic cell, specified by $E[1,y]$ where $1 \leq y \leq M$, receives data from the first interface;

(ii) an arithmetic cell, specified by $E[x,y]$ where $2 \leq x \leq M$ and $x \leq y \leq M$, receives data from an $E[x-1,y]$ arithmetic cell as well as from an $E[x-1,y-1]$ arithmetic cell; and (iii) an $E[M,M]$ arithmetic cell provides data to the second interface.

In the above-described signal processor, a plurality of arithmetic cells concurrently operate, whereupon multi-input/single output convergence processing is performed. Additionally, tree-structure data buses suitable for convergence processing operation are used, whereupon a smaller bus structure is accomplished.

This invention provides another signal processor in which a plurality of concurrently operable arithmetic cells are two-dimension placed such that the arithmetic cells have a pyramid hierarchical structure, and individual common buses are provided between each hierarchy. More specifically, this signal processor includes:

(a) an arithmetic unit for performing arithmetic operations on data;

(b) a first interface for receiving external data signals and for transmitting data corresponding to the received signals to the arithmetic unit; and (c) a second interface for receiving data processed by the arithmetic unit and for providing data signals corresponding to the received data;

the arithmetic unit including:

(a-1) an array of a plurality of concurrently operable arithmetic cells arranged in columns and rows wherein each of the arithmetic cells is specified by a denotation of $E[x,y]$ where x is a column number subscript satisfying $1 \leq x \leq M$ and y is a row number subscript satisfying $x \leq y \leq M$, M being an integer such that $M \geq 2$; and (a-2) a plurality of time division multiplex common buses $B[k]$ each providing a path connecting an arithmetic cell specified by $E[k,y]$ where $k \leq y \leq M$ and an arithmetic cell specified by $E[k+1,y]$ where $k+1 \leq y \leq M$, k being an integer such that $1 \leq k \leq M-1$;

wherein:

(i) an arithmetic cell, specified by $E[1,y]$ where $1 \leq y \leq M$, receives data from the first interface;

(ii) an arithmetic cell, specified by $E[k+1,y]$ where $k+1 \leq y \leq M$, receives data from an arithmetic cell specified by $E[k,y]$ where $k \leq y \leq M$ through a common bus $B[k]$; and (iii) an $E[M,M]$ arithmetic cell provides data to the second interface.

3

In the above-described signal processor, a plurality of arithmetic cells concurrently operate, whereupon multi-input/single output convergence processing is performed. Additionally, a time division multiple (TDM) common bus is arranged between each hierarchy, thereby reducing the size of bus structure and enabling use of common buses suitable for convergence processing.

4

DETAILED DESCRIPTION OF THE INVENTION

With reference to the accompanying drawing figures, preferred embodiments of this invention are illustrated below.

EMBODIMENT 1

Figure 1:
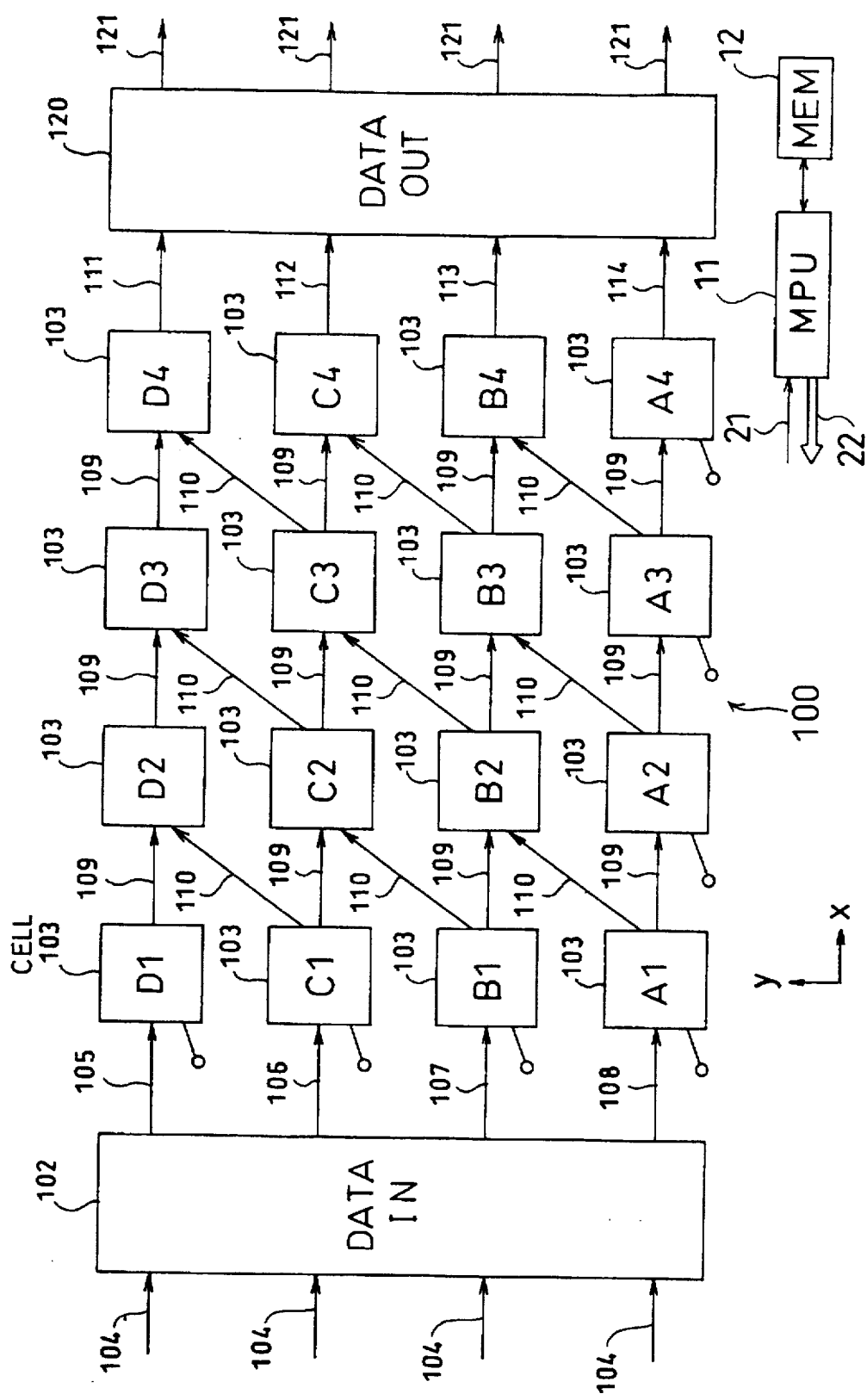
FIG. 1 illustrates in block form a signal processor in accordance with the first embodiment of the present invention.

Referring first to FIG. 1, there is shown an image processor in accordance with the first embodiment of the present invention. 100 is an array of sixteen arithmetic cells 103 capable of concurrently operating, and each CELL 103 is specified by a denotation of $E[x,y]$ where x is a column number satisfying $1 \leq x \leq 4$ and y is a row number satisfying $1 \leq y \leq 4$. 102 is a data-in part. 120 is a data-out part. Arithmetic array 100 performs arithmetic operations on data received from data-in part 102 and provides the result to data-out part 120. CELLS 103 that are arranged in the first column and specified by $E[1,y]$ where $1 \leq y \leq 4$, are called A1, B1, C1, and D1, respectively. CELLS 103 that are arranged in the second column and specified by $E[2,y]$ where $1 \leq y \leq 4$, are called A2, B2, C2, and D2, respectively. CELLS 103 that are arranged in the third column and specified by $E[3,y]$ where $1 \leq y \leq 4$, are called A3, B3, C3, and D3, respectively. CELLS 103 that are arranged in the fourth column and specified by $E[4,y]$ where $1 \leq y \leq 4$, are called A4, B4, C4, and D4, respectively. Data-in part 102 receives external data signals (pixel signals) at its four inputs 104. Transferring of data from data-in part 102 to CELL D1 is performed over data bus 105. Transferring of data from data-in part 102 to CELL C1 is performed over data bus 106. Transferring of data from data-in part 102 to CELL B1 is performed over data bus 107. Transferring of data from data-in part 102 to CELL A1 is performed over data bus 108. CELL 103 that is specified by $E[x,y]$ where $2 \leq x \leq 4$ and $2 \leq y \leq 4$, receives data from $E[x-1,y]$ CELL 103 via data bus 109 as well as from $E[x-1,y-1]$ CELL 103 via data bus 110. BUS 109 that provides a path connecting $E[x-1,y]$ CELL and $E[x,y]$ CELL for data transfer is called a direct bus, whereas BUS 110 that provides a path connecting $E[x-1, y-1]$ CELL and $E[x,y]$ CELL is called an oblique path. DIRECT BUS 109 is arranged between each cell in the first row of array 100, i.e., between CELL A1 and CELL A2, between CELL A2 and CELL A3, and between CELL A3 and A4. Transferring of data from CELL D4 to data-out part 120 is performed over data bus 111. Transferring of data from CELL C4 to data-out part 120 is performed over data bus 112. Transferring of data from CELL B4 to data-out part 120 is performed over data bus 113. Transferring of data from CELL A4 to data-out part 120 is performed over data bus 114. In response, data-out part outputs data signals (pixel signals) at its respective outputs 121. The FIG. 1 image processor further has MPU 11 and memory 12 which are detailed later.

Figure 2:
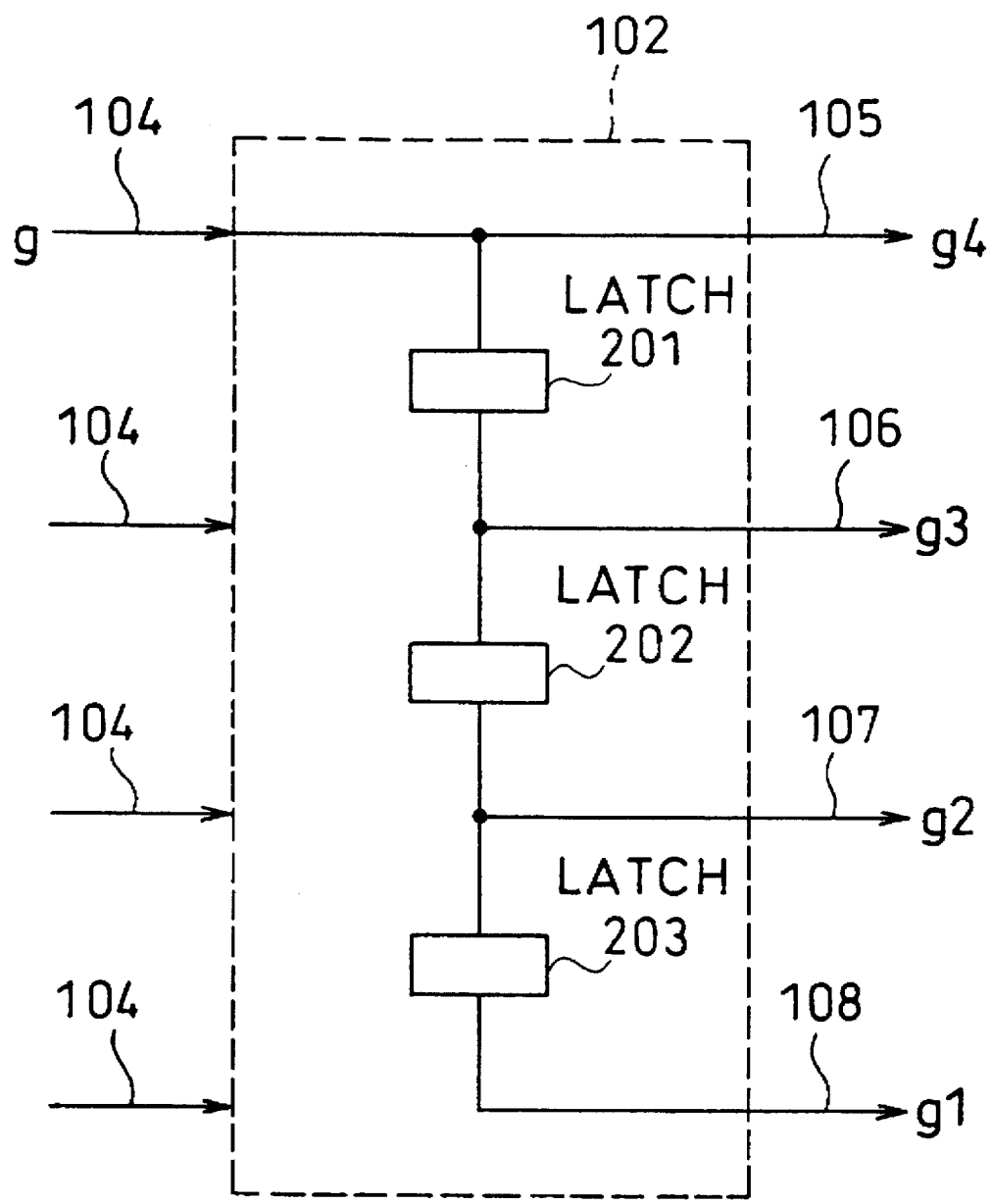
FIG. 2 depicts the internal structure of a data-in part of FIG. 1.

Referring now to FIG. 2, there is illustrated the internal structure of data-in part 102 when the FIG. 1 image processor operates as a 4-tap horizontal filter. This data-in part 102, shown in FIG. 2, is formed by cascading three latches 201, 202, and 203. In order that PIXEL DATA g1, PIXEL DATA g2, PIXEL DATA g3, and PIXEL DATA g4 as to four pixels arranged in the horizontal direction in an image are fed to CELLS A1, B1, C1, and D1, respectively, (a) a pixel signal g, applied at one of the four inputs 104, is supplied as PIXEL DATA g4 to BUS 105 as well as to latch 201 at the first stage, (b) latch 201 provides PIXEL DATA g3 to BUS 106, (c) latch 202 at the second stage provides PIXEL DATA g2 to BUS 107, and (d) latch 203 at the third stage provides PIXEL DATA g1 to BUS 108.

Figure 3:
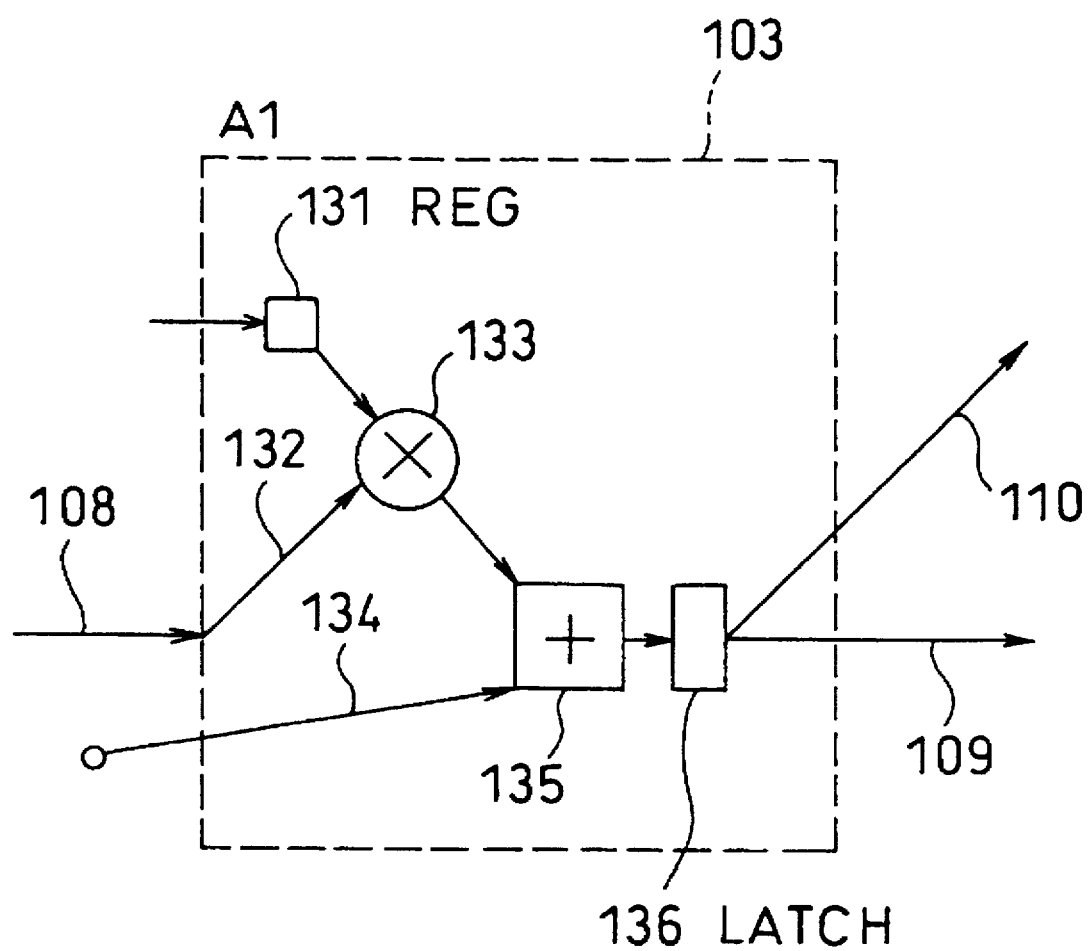
FIG. 3 shows the internal structure of an arithmetic cell of FIG. 1.

FIG. 3 depicts the internal structure of CELL A1 of FIG. 1. 131 is a coefficient register capable of being rewritten. 133 is a multiplier. 135 is an adder. 136 is a latch. Multiplier 133 provides a product output indicative of the product of a coefficient held in register 131 and a first input 132 received via BUS 108. Adder 135 provides a sum output indicative of the sum of a product output from multiplier 133 and a second input 134. Latch 136 holds a sum output from adder 135 for forwarding to DIRECT BUS 109 as well as to OBLIQUE BUS 110. The other remaining arithmetic cells 103 of FIG. 1, i.e., CELLS A2–A4, B1–B4, C1–C4, and D1–D4, each have the same structure as CELL A1 of FIG. 3; however, CELLS E[x,y] where $2 \leq x \leq 4$ and $2 \leq y \leq 4$ (i.e., B3, C3, D3, B4, C4, D4) each receive INPUT 132 via DIRECT BUS 109 and INPUT 134 via OBLIQUE BUS 110.

MPU 11 shown in FIG. 1, upon receipt of a processing switch request signal at control input 21, sets coefficients to coefficient registers 131 of the sixteen arithmetic cells 103 and further sets constants to INPUTS 134 of the seven arithmetic cells 103 forming the first column and the first row of arithmetic array 100, i.e., CELLS A1, E1, C1, D1, A2, A3, and A4, through BUS 22. Memory 12 stores programs that MPU 11 executes in response to the processing switch request signal and data for use in the aforesaid setting.

Figure 4:
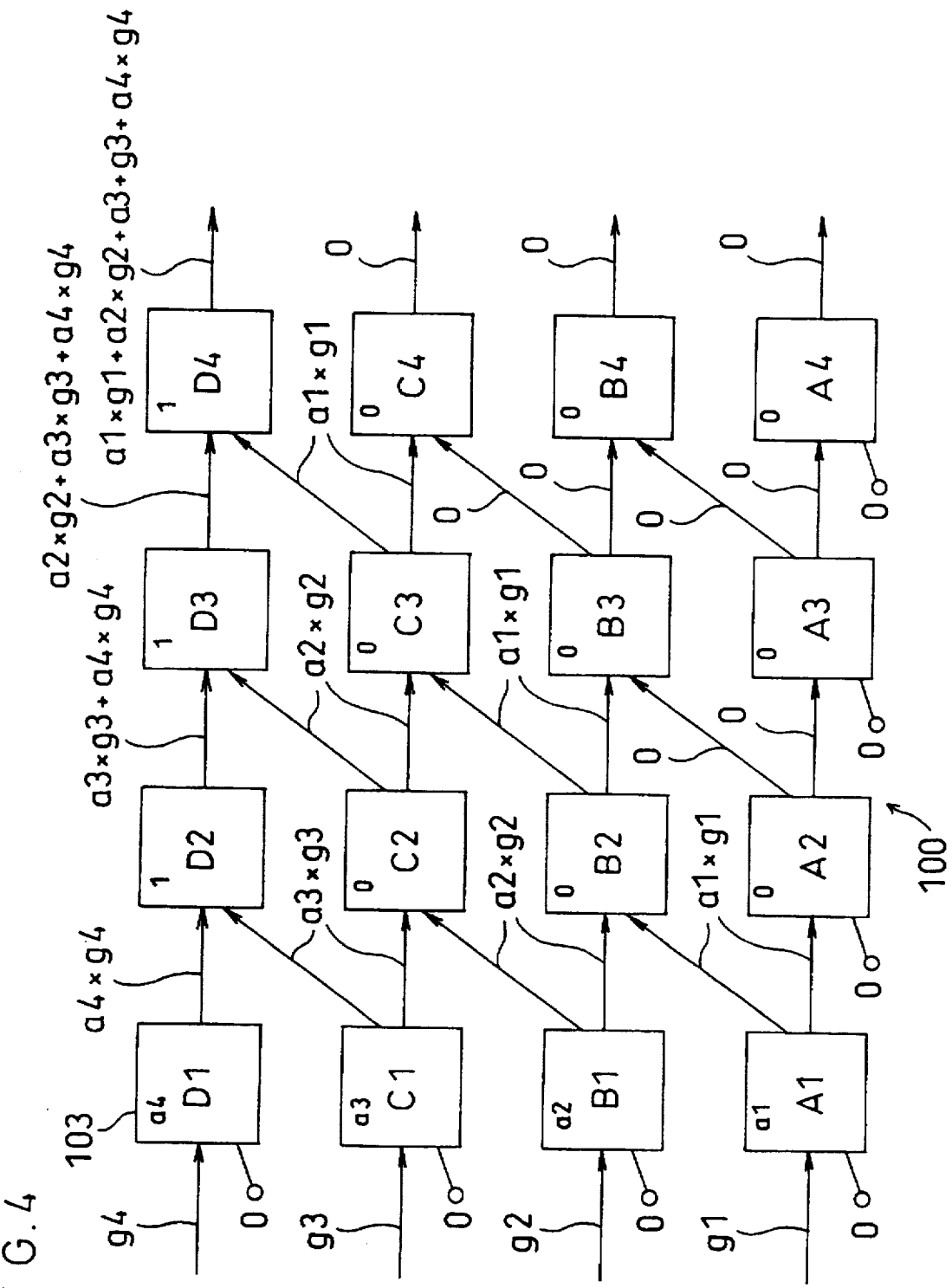
FIG. 4 is a diagram useful in understanding the operation of an arithmetic array of FIG. 1.

Referring now to FIG. 4, the operation of arithmetic array 100 of FIG. 1 is described. The setting of coefficients to each of coefficient registers 131 is performed as follows. Registers 131 of CELLS A1, E1, C1, and D1 in the first column hold a coefficient of a1, a coefficient of a2, a coefficient of a3, and a coefficient of a4, respectively. Registers 131 of CELLS A2, B2, C2, and D2 in the second column hold a coefficient of 0, a coefficient of 0, a coefficient of 0, and a coefficient of 1, respectively. Registers 131 of CELLS A3, B3, C3, and D3 in the third column hold a coefficient of 0, a coefficient of 0, a coefficient of 0, and a coefficient of 1, respectively. Registers 131 of CELLS A4, B4, C4, and D4 in the fourth column hold a coefficient of 0, a coefficient of 0, a coefficient of 0, and a coefficient of 1, respectively. Additionally, it is preset such that each of the seven arithmetic cells 103 forming the first column and the first row (CELLS A1, E1, C1, D1, A2, A3, A4) is fed a constant of 0 as INPUT 134 (the second input).

PIXEL DATA g1–g4 as to four pixels arranged in the horizontal direction are fed to data-in part 102. Upon receipt of PIXEL DATA g1 from data-in part 102, CELL A1 outputs a1×E1. Upon receipt of PIXEL DATA g2 from data-in part 102, CELL B1 outputs a2×g2. Upon receipt of PIXEL DATA g3 from data-in part 102, CELL C1 outputs a3×g3. Upon receipt of PIXEL DATA g4 from data-in part 102, CELL D1 outputs a4×g4. As a result, in the second-column cells, CELL A2 receives a1×g1, CELL B2 receives a1×g1 and a2×g2, CELL C2 receives a2×g2 and a3×g3, and CELL D2 receives a3×g3 and a4×g4. Therefore, CELL A2 outputs 0, CELL B2 outputs a1×g1, CELL C2 outputs a2×g2, and CELL D2 outputs a3×g3+a4×g4. In the third-column cells, CELL A3 receives 0, CELL B3 receives 0 and a1×g1, CELL C3 receives a1×g1 and a2×g2, and CELL D3 receives a2×g2 and a3×g3+a4×g4. Therefore, CELL A3 outputs 0, CELL B3 outputs 0, CELL C3 outputs a1×g1, and CELL D3 outputs a2×g2+a3×g3+a4×g4. In the fourth-column cells, CELL A4 receives 0, CELL B4 receives 0 and 0, CELL C4 receives 0 and a1×g1, and CELL D4 receives a1×g1 and a2×g2+a3× g3+a4×g4. Therefore, CELL A4 outputs 0, CELL B4 outputs 0, CELL C4 outputs 0, and CELL D4 outputs a1×g1+a2× g2+a3×g3+a4×g4. The output of CELL D4 (a1×g1+a2×g2+ a3×g3+a4×g4) is provided as a result of the horizontal filter processing via data-out part 120.

In accordance with the FIG. 1 image processor, CELLS A1, B1, C1, D1, B2, C2, D2, C3, D3, and D4 that are interconnected by BUSES 109 and 110 to form a tree structure are mainly used to perform 4-tap horizontal filter processing. If the contents of coefficient registers 131 are modified in order that CELLS A2, B2, C2, B3, C3, and C4 are mainly used, this achieves 3-tap horizontal filter processing. Additionally, by operating a group of CELLS A3, B3, and B4 independently of the operation of a group of CELLS C3, D3, and D4, separate 2-tap horizontal filter processing operations may be performed.

Replacement of latches 201–203 of data-in part 102 with line memories enables arithmetic array 100 to operate as a 2-, 3-, or 4-tap vertical filter. Additionally, replacement of latches 201–203 of data-in part 102 with field memories enables arithmetic array 100 to operate as a temporal filter. Data-in part 102 may be constructed in such a way as to provide, as pixel data, external pixel signals applied at the four inputs 104, to CELLS A1, B1, C1, and D1 in the first column.

In the foregoing 4-tap horizontal filter, of all the four outputs 121 of the data-out part 120 only one output 121 is used; however, when each of the fourth-column cells (A4, B4, C4, D4) provides valid data, all the outputs 121 of the data-out part 120 can be available. In this case, if a buffer memory is incorporated into the data-out part 120, this enables one of the four outputs 121 to be used in a time division multiplex fashion.

In the present embodiment, the arithmetic array 100 is formed of an array of arithmetic cells arranged in four columns and four rows. Any other array structure, for example, a 4 by 8 array structure, may be used. In the present embodiment, each arithmetic cell 103 is built in accordance with a multiply-add operation cell structure, in other words each arithmetic cell 103 is composed of one multiplier 133 and one adder 135, as shown in FIG. 3. Other structures may be used. For example, in the foregoing 4-tap horizontal filter, each CELL A1, A2, A3, A4, B1, C1, D1 to which zero is applied as the second input 134 is provided with an adder 135. However, such provision may be omitted and the multiplier 133 may direct-output to the latch 136. Additionally, each arithmetic cell 103 may have a plurality of multipliers and a plurality of adders for multiply-add operation. Each arithmetic cell 103 may be composed of an MPU.

EMBODIMENT 2

Figure 5:
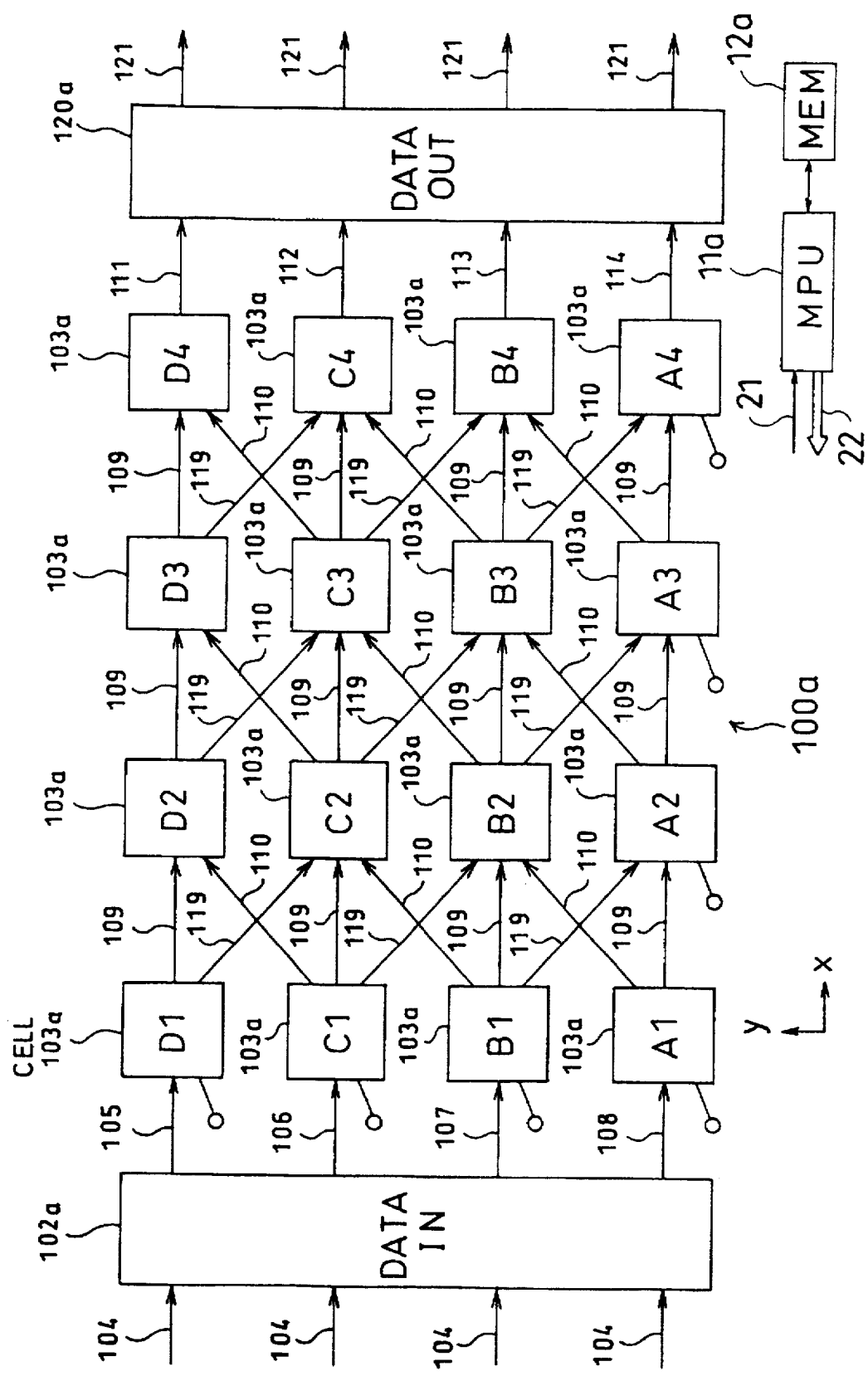
FIG. 5 illustrates in block form a signal processor in accordance with the second embodiment of the present invention.

Referring now to FIG. 5, there is shown in block form an image processor built in accordance with the second embodiment of the present invention. Like the FIG. 1 image processor, the FIG. 5 image processor is formed of arithmetic array 100a for performing arithmetic operations on data, data-in part 102a for receiving external data signals and transmitting data corresponding to the signals received to arithmetic array 100a, and data-out part 120a for receiving data processed by arithmetic array 100a and for providing data signals corresponding to the data received. Arithmetic array 100a is formed of an array of sixteen arithmetic cells 103a capable of concurrently operating, and each CELL 103a is specified by a denotation of E[x,y] where $1 \leq x \leq 4$ and $1 \leq y \leq 4$. CELL 103a that is specified by E[x,y] where $2 \leq x \leq 4$ and $2 \leq y \leq 4$, receives data from E[x−1,y] CELL 103a via DIRECT BUS 109 as well as from E[x−1, y−1] CELL 103a via OBLIQUE BUS 110. CELL 103a that is specified by E[x,1] where $2 \leq x \leq 4$, receives data from E[x−1,1] CELL 103a via DIRECT BUS 109. CELL 103a that is specified by E[x,y] where 2≦x≦4 and 1≦y≦3, also receives data from E[x−1,y+1] CELL 103a via a reverse oblique bus 119. Arithmetic array 100a of the present embodiment is one resulting from adding nine reverse oblique buses 119 to arithmetic array 100 of FIG. 1. For example, one of REVERSE OBLIQUE BUSES 119 takes a route extending away from CELL D1 to CELL C2. The FIG. 5 image processor further includes MPU 11a and memory 12a for the setting of coefficients to coefficient registers incorporated in each arithmetic cell 103a.

The FIG. 5 image processor having BUSES 109, 110, 119 achieves processing operations with better flexibility in comparison with the FIG. 1 image processor. Arithmetic array 100 in FIG. 1 may include, for example, a data bus providing a path extending from CELL A1 to CELL C2 and a data bus providing a path extending from CELL B1 to CELL D2.

EMBODIMENT 3

Figure 6:
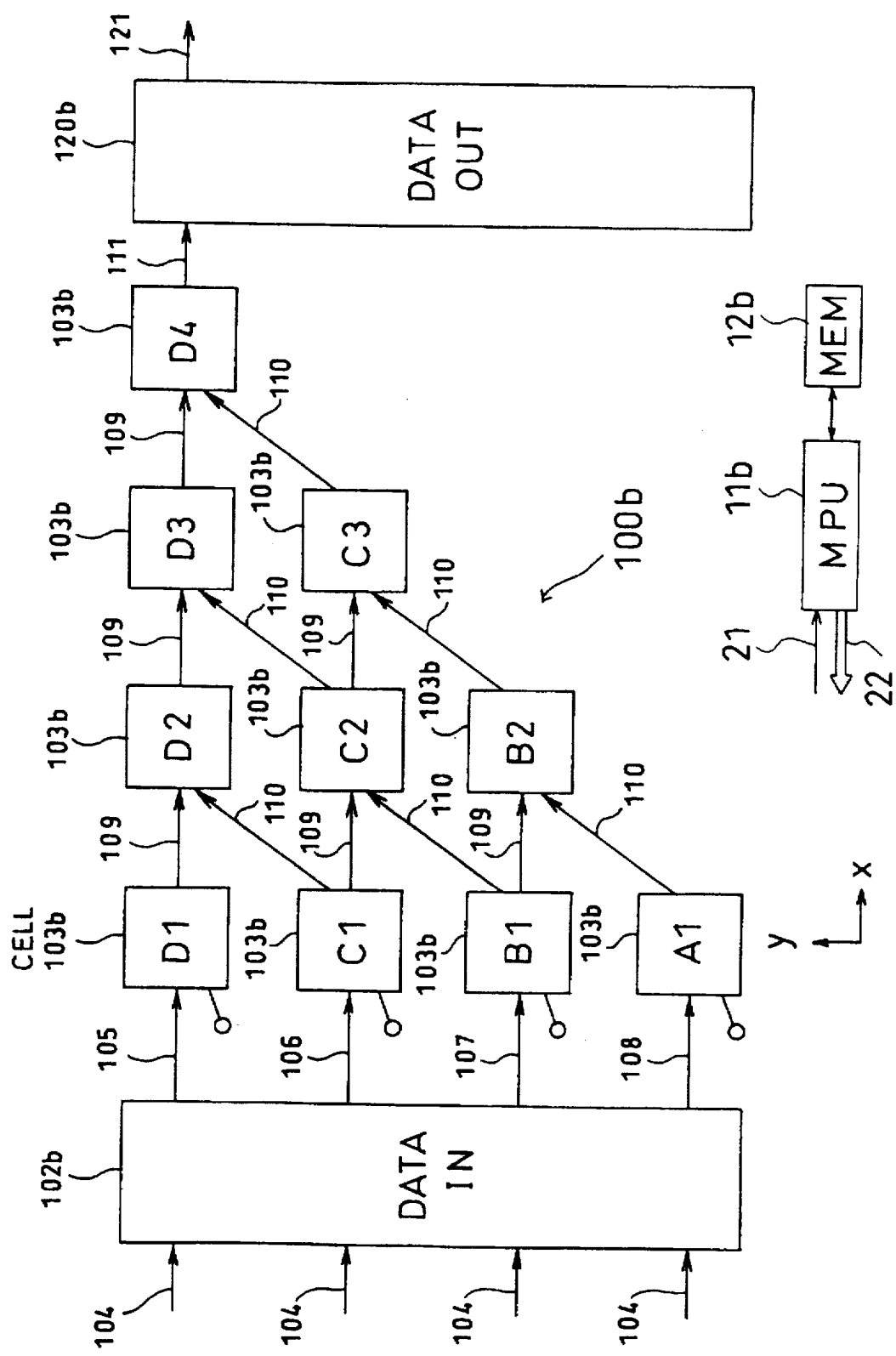
FIG. 6 illustrates in block form a signal processor in accordance with the third embodiment of the present invention.

Referring now to FIG. 6, there is illustrated in block form an image processor in accordance with the third embodiment of the present invention. 100b is an array of ten arithmetic cells 103b capable of concurrently operating, and each CELL 103b is specified by a denotation of E[x,y] where 1≦x≦4 and x≦y≦4. Arithmetic array 100b performs arithmetic operations on data received from data-in part 102b to provide the result to data-out part 120b. CELLS 103b that are arranged in the first column and specified by E[1,y] where 1≦y≦4, are called A1, B1, C1, and D1, respectively. CELLS 103b that are arranged in the second column and specified by E[2,y] where 2≦y≦4, are called B2, C2, and D2, respectively. CELLS 103b that are arranged in the third column and specified by E[3,y] where 3≦y≦4, are called C3 and D3, respectively. Finally, CELL 103b that is arranged in the fourth column and specified by E[4,4], is called D4. Data-in part 102b inputs external data signals (pixel signals) at its four inputs 104. Transferring of data from data-in part 102b to CELL D1 is performed over BUS 105. Transferring of data from data-in part 102b to CELL C1 is performed over BUS 106. Transferring of data from data-in part 102b to CELL B1 is performed over BUS 107. Transferring of data from data-in part 102b to CELL A1 is performed over BUS 108. CELL 103b that is specified by E[x,y] where 2≦x≦4 and x≦y≦4, receives data from E[x−1,y] CELL via DIRECT BUS 109 as well as from E[x−1,y−1] CELL via OBLIQUE BUS 110. Transferring of data from CELL D4 to data-out part 120b is performed over BUS 111. Data-out part 120b provides a data signal (pixel signal) at its output 121. The FIG. 6 image processor further includes MPU 11b and memory 12b which are detailed later.

Figure 7:
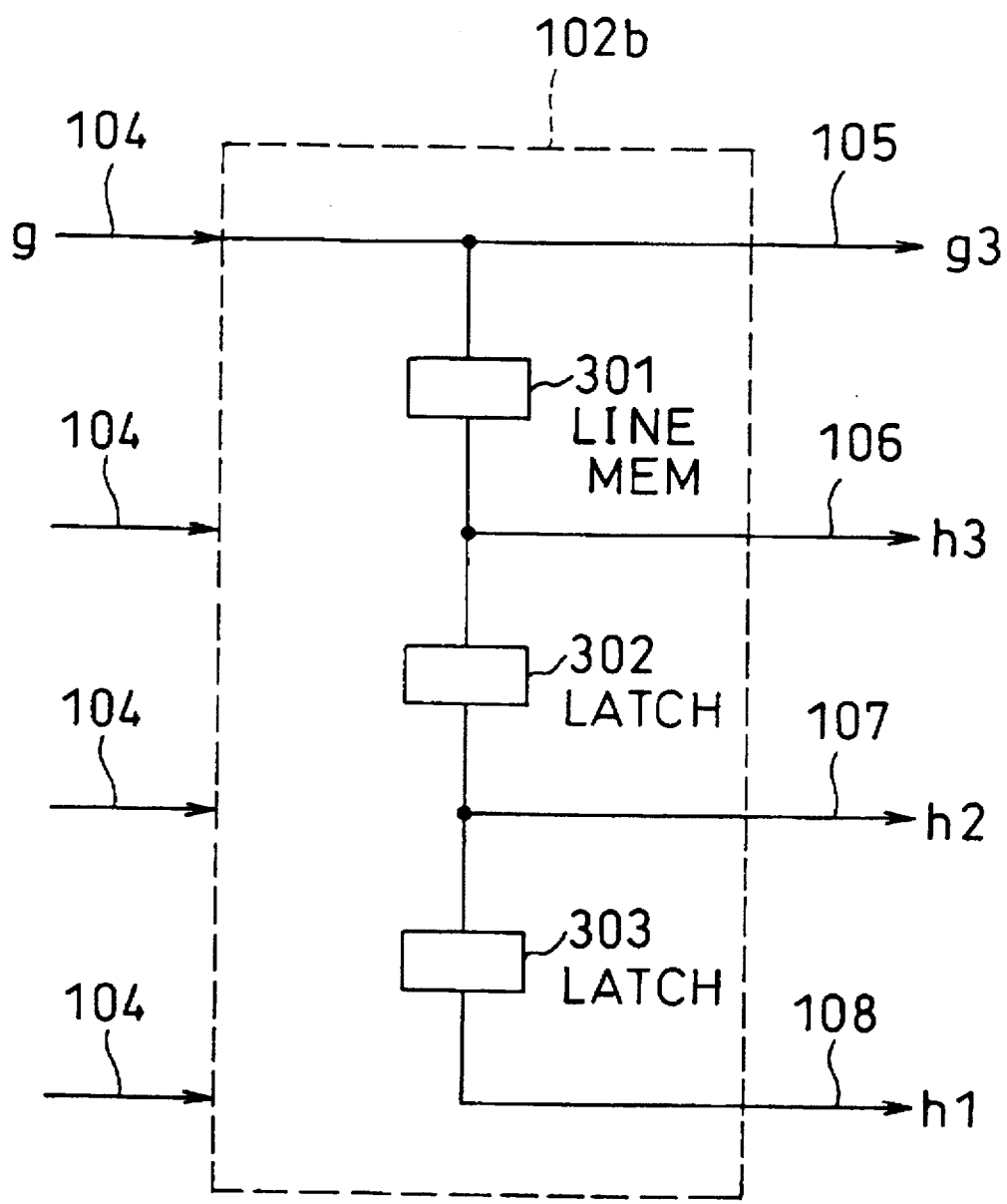
FIG. 7 depicts the internal structure of a data-in part of FIG. 6.

FIG. 7 shows an example of the internal structure of data-in part 102b when the FIG. 6 image processor operates as an apparatus which combines the functions of a 2-tap horizontal filter and a 2-tap vertical filter and which has a function of synthesizing the outputs of the 2-tap horizontal filter and the 2-tap vertical filter. Data-in part 102b of FIG. 7 has one line memory 301 and two latches 302 and 303, for the holding of data. In this example, in order that PIXEL DATA h3 that is one line ahead of PIXEL DATA g3 to be fed to CELL D1 is supplied to CELL C1, and in order that PIXEL DATA h1–h3 arranged in the horizontal direction are supplied to respective arithmetic cells (A1, E1, C1), (a) PIXEL SIGNAL g, applied at one of the four inputs 104, is fed as PIXEL DATA g3 to BUS 105 as well as to line memory 301, and (b) line memory 301 provides PIXEL DATA h3 to BUS 106, latch 302 at the first stage provides PIXEL DATA h2 to BUS 107, and latch 303 at the second stage provides PIXEL DATA h1 to BUS 108.

Figure 8:
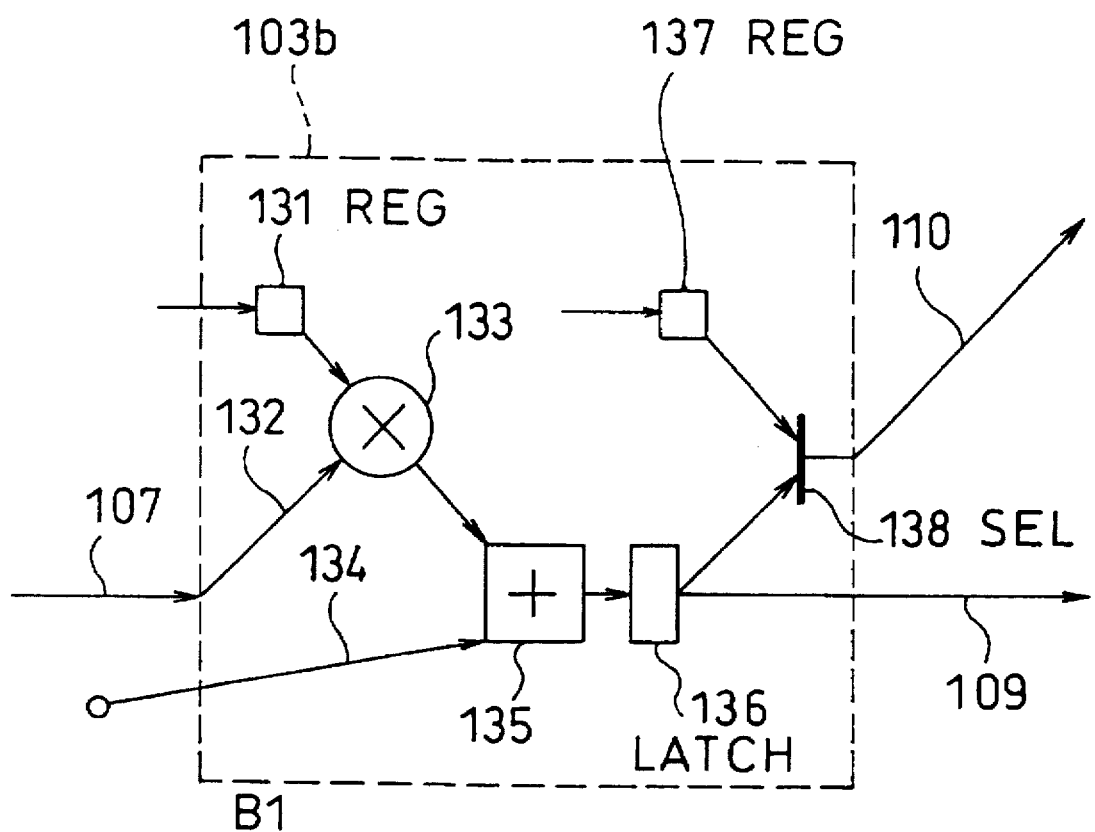
FIG. 8 shows the internal structure of an arithmetic cell of FIG. 6.

Now referring to FIG. 8, there is shown the internal structure of CELL B1 of FIG. 6. The FIG. 8 internal structure and the FIG. 3 internal structure are identical with each other with the exception that the former additionally includes a second coefficient register 137 capable of being rewritten and a selector 138. Each of coefficient register 131 (the first coefficient register), multiplier 133, and adder 135 of FIG. 8 has the same function as their counterparts of FIG. 3. Latch 136 holds a sum output from adder 135 for forwarding to DIRECT BUS 109 as well as to selector 138. Selector 138 performs selection between a coefficient held in coefficient register 137 (the second coefficient register) and an output of latch 136, for forwarding to OBLIQUE BUS 110. Other CELLS 103b of FIG. 6 each have the same internal structure as CELL B1 of FIG. 8; however, CELLS, specified by E[x,y] where 2≦x ≦4 and x≦y≦4 (i.e., B2, C2, D2, C3, D3, D4), each receive INPUT 132 (the first input) via DIRECT BUS 109 and INPUT 134 (the second input) via OBLIQUE BUS 110.

MPU 11b, upon receipt of a processing switch request signal at control input 21, sets coefficients to first and second coefficient registers 131 and 137 of the ten arithmetic cells 103b and further sets constants to INPUTS 134 of CELLS A1, B1, C1, and D1 in the first column, through BUS 22. Memory 12b stores programs that MPU 11b executes in response to the processing switch request signal and data for use in the aforesaid setting.

Figure 9:
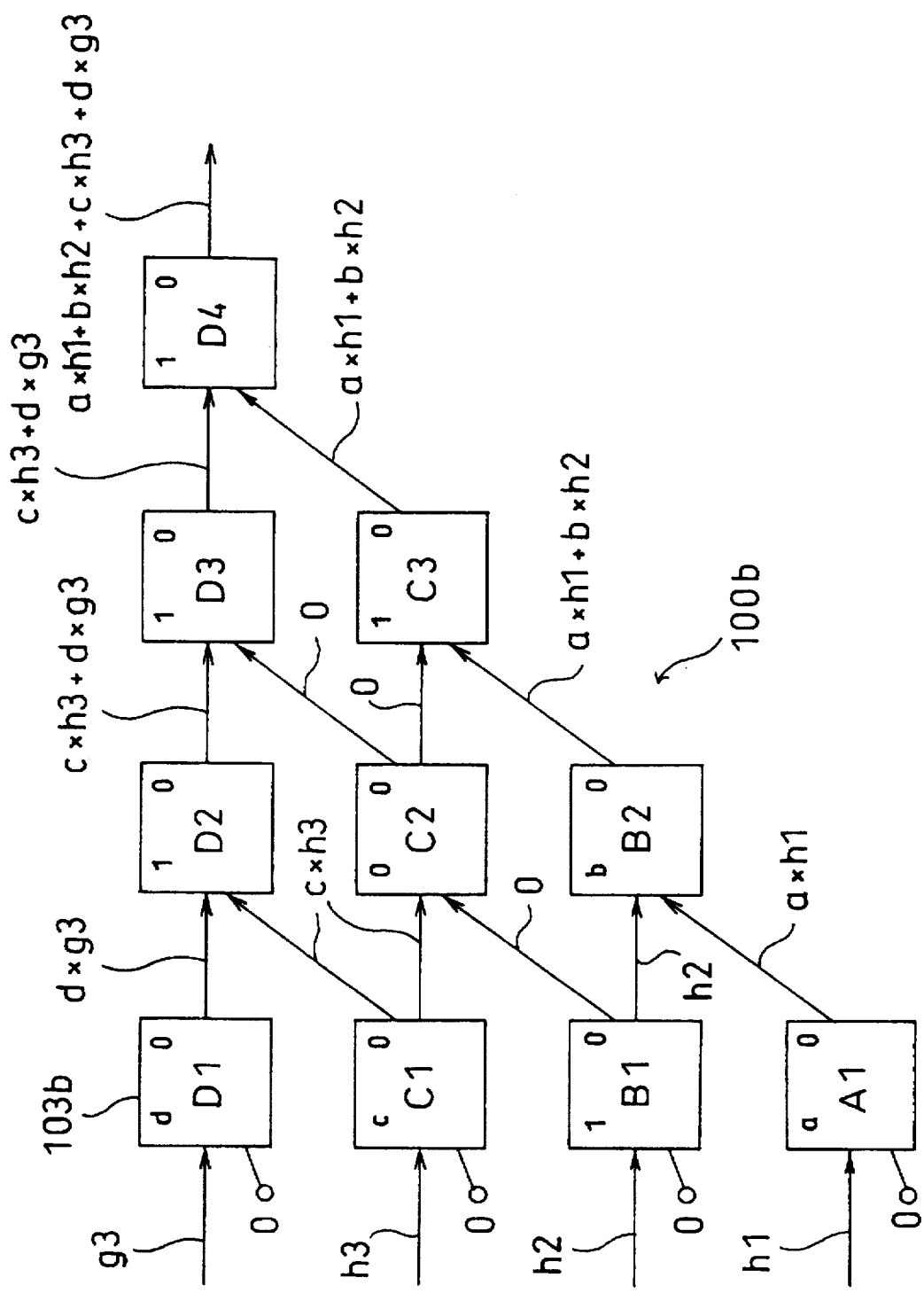
FIG. 9 is a diagram useful in understanding the operation of an arithmetic array of FIG. 6.

FIG. 9 illustrates the operation of arithmetic array 100b of FIG. 6. The setting of coefficients to first coefficient registers 131 and to second coefficient registers 137 is performed as follows. In CELLS A1, B1, C1, and D1 in the first column, their first coefficient registers 131, on the one hand, are set such that they hold coefficients of a, 1, c, and d, respectively, while on the other hand their second coefficient registers 137 are set such that they hold coefficients of 0, 0, 0, and 0, respectively. Additionally, CELLS A1, B1, C1, and D1 in the first column each receive a coefficient of 0 as INPUT 134 (the second input). In CELLS B2, C2, and D2 in the second column, their first coefficient registers 131 are set such that they hold coefficients of b, 0, and 1, respectively, while their second coefficient registers 137 are set such that they hold coefficients of 0, 0, and 0, respectively. In CELLS C3 and D3 in the third column, their first coefficient registers 131 are set such that they hold coefficients of 1 and 1, respectively, while their second coefficient registers 137 are set such that they hold coefficients of 0 and 0, respectively. In CELL D4 in the fourth column, its first coefficient register 131 is set such that it holds a coefficient of 1 while its second coefficient register 137 is set such that it holds a coefficient of 0.

Four data items (PIXEL DATA h1, h2, h3, and g3) are fed from data-in part 102b to CELLS A1, B1, C1, and D1 in the first column, respectively. CELL A1 outputs a×h1. CELL C1 outputs c×h3. CELL D1 outputs d×g3. CELL B1 outputs 1×h2 (=h2) to CELL B2. CELL B1 also outputs 0 held in its second coefficient register 137, to CELL C2. As a result, in the second column, CELL B2 receives a×h1 and h2, CELL C2 receives 0 and c×h3, and CELL D2 receives c×h3 and d×g3. Therefore, CELL B2 outputs a×h1+b×h2, CELL C2 outputs 0, and CELL D2 outputs c×h3+d×g3. Here, whereas the output data of CELL B2 (a×h1+b×h2) represents a 2-tap horizontal filter processing result, the output data of CELL D2 (c×h3+d×g3) represents a 2-tap vertical filter processing result.

In the third column, CELL C3 receives a×h1+b×h2 and 0, and CELL D3 receives 0 and c×h3+d×g3. Therefore, CELL C3 outputs a×h1+b×h2 and CELL D3 outputs c×h3+d ×g3. In the fourth column, CELL D4 receives a×h1+b ×h2 and c×h3+d×g3, thereafter outputting a×h1+b×h2+c ×h3+d×g3. The output data of CELL D4 (a×h1+b×h2+c×h3+d×g3) is provided in the form of a synthetic result of a 2-tap horizontal filter processing result and a 2-tap vertical filter processing result, via data-out part 120b.

In accordance with the FIG. 6 image processor, a group of CELLS A1, B1, and B2 operates independently of another group of CELLS C1, D1, and D2. This achieves concurrent operation of 2-tap horizontal filter processing and 2-tap vertical filter processing. In addition to this, the results of both the processing can be synthesized using the remaining arithmetic cells, namely CELLS C2, C3, D3, and D4.

As can be understood from the first embodiment, if data-in part 102b employs a structure of FIG. 2, this achieves effective 4-tap horizontal filter processing by means of CELLS A1, E1, C1, D1, B2, C2, D2, C3, D3, and D4 that are connected together by BUSES 109, 110 to form a tree structure.

EMBODIMENT 4

Figure 10:
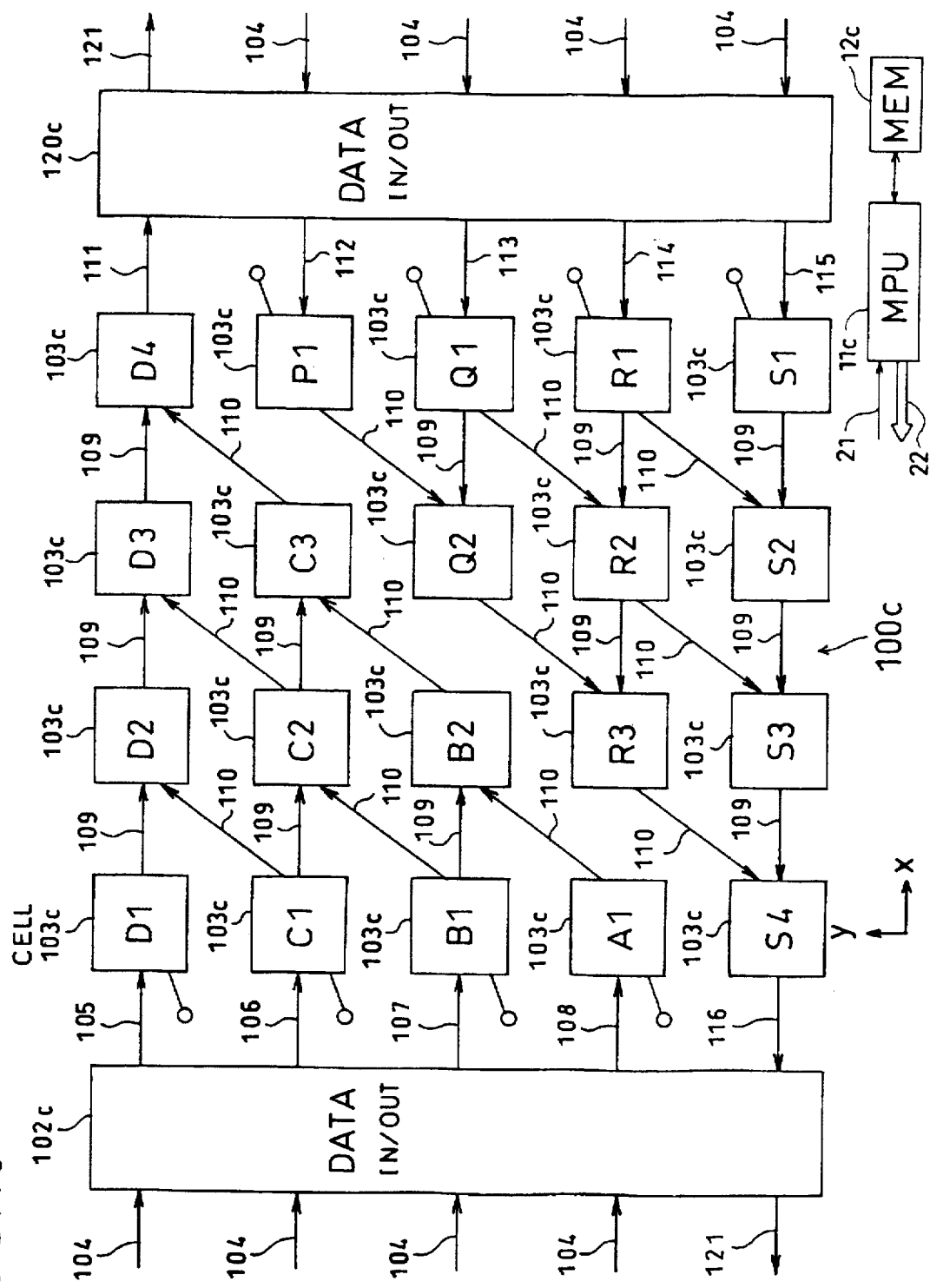
FIG. 10 illustrates in block form a signal processor in accordance with the fourth embodiment of the present invention.

Referring now to FIG. 10, there is illustrated an image processor in accordance with the fourth embodiment of the present invention. The present image processor includes arithmetic array 100c, first data-in/out (DIO) part 102c, and second DIO part 120c. Arithmetic array 100c is formed of an array of twenty arithmetic cells 103c capable of concurrently operating, and each CELL 103c is specified by a denotation of E[x,y] where $1 \leq x \leq 4$ and $1 \leq y \leq 5$. Arithmetic array 100c receives data from first DIO part 102c, performs arithmetic operations on the data received, and provides the result to second DIO part 120c. On the other hand, arithmetic array 100c receives data from second DIO part 120c, performs arithmetic operations on the data received, and provides the result to first DIO part 102c. Four CELLS 103c in the first column that are specified by E[1,y] where $2 \leq y \leq 5$, are called A1, B1, C1 and D1, respectively. Three CELLS 103c in the second column that are specified by E[2,y] where $3 \leq y \leq 5$, are called B2, C2, and D2, respectively. Two CELLS 103c in the third column that are specified by E[3,y] where $4 \leq y \leq 5$, are called C3 and D3, respectively. CELL 103c in the fourth column that is specified E[4,5], is called D4. The remaining four CELLS 103c in the fourth column that are specified by E[4,y] where $4 \geq y \geq 1$, are called P1, Q1, R1 and S1, respectively. The remaining three CELLS 103c in the third column that are specified by E[3,y] where $3 \geq y \geq 1$, are called Q2, R2 and S2, respectively. The remaining two CELLS 103c in the second column that are specified by E[2,y] where $2 \leq y \leq 1$, are called R3 and S3, respectively. Finally, the remaining CELL 103c in the first column that is specified by E[1,1] is called S4.

First DIO part 102c receives external data signals (pixel signals) at its four inputs 104. Likewise, second DIO part 120c receives external data signals (pixel signals) at its four inputs 104. Transferring of data from first DIO part 102c to CELL D1 is performed over BUS 105. Transferring of data from first DIO part 102c to CELL C1 is performed over BUS 106. Transferring of data from first DIO part 102c to CELL B1 is performed over BUS 107. Transferring of data from first DIO part 102c to CELL A1 is performed over BUS 108. CELL 103c that is specified by E[x,y] where $2 \leq x \leq 4$ and $x+1 \leq y \leq 5$, receives data from E[x−1,y] CELL via DIRECT BUS 109 as well as from E[x−1,y−1] CELL via OBLIQUE BUS 110. Transferring of data from CELL D4 in the fourth column to second DIO part 120c is performed over BUS 111. In response, second DIO part 120c provides a data signal (pixel signal) at its output 121. On the other hand, transferring of data from second DIO part 120c to CELL P1, to CELL Q1, to CELL R1, and to CELL S1 is performed over BUSES 112, 113, 114, and 115, respectively. CELL 103c that is specified by E[x,y] where $1 \leq x \leq 3$ and $1 \leq y \leq x$, receives data from E[x+1,y] CELL via DIRECT BUS 109 as well as from E[x+1,y+1] CELL via OBLIQUE BUS 110. Transferring of data from CELL S4 in the first column to first DIO part 102c is performed over BUS 116. First DIO part 102c provides a data signal (pixel signal) at its output 121.

Arithmetic array 100c of FIG. 10 has a structure implemented by filling a blank part of arithmetic array 100b of FIG. 6 with an identical array. Therefore, when mounted onto LSIs, chip area can be used more effectively in comparison with arithmetic array 100b. The FIG. 10 image processor further includes MPU 11c and memory 12c for, for example, the setting of coefficients to coefficient registers incorporated in each arithmetic cell 103c.

In accordance with the present image processor of FIG. 10, a group of CELLS A1, B1, C1, D1, B2, C2, D2, C3, D3, and D4 that are interconnected together by BUSES 109 and 110 to form a tree structure operates independently of a group of CELLS P1, Q1, R1, S1, Q2, R2, S2, R3, S3, and S4 that are interconnected together by BUSES 109 and 110 to form a tree structure. This allows for one of the groups to perform horizontal filter processing and for the other group to perform vertical filter processing. Additionally, external interconnecting of these twenty CELLS 103c to form a loop facilitates the formation of cyclic filters.

EMBODIMENT 5

Figure 11:
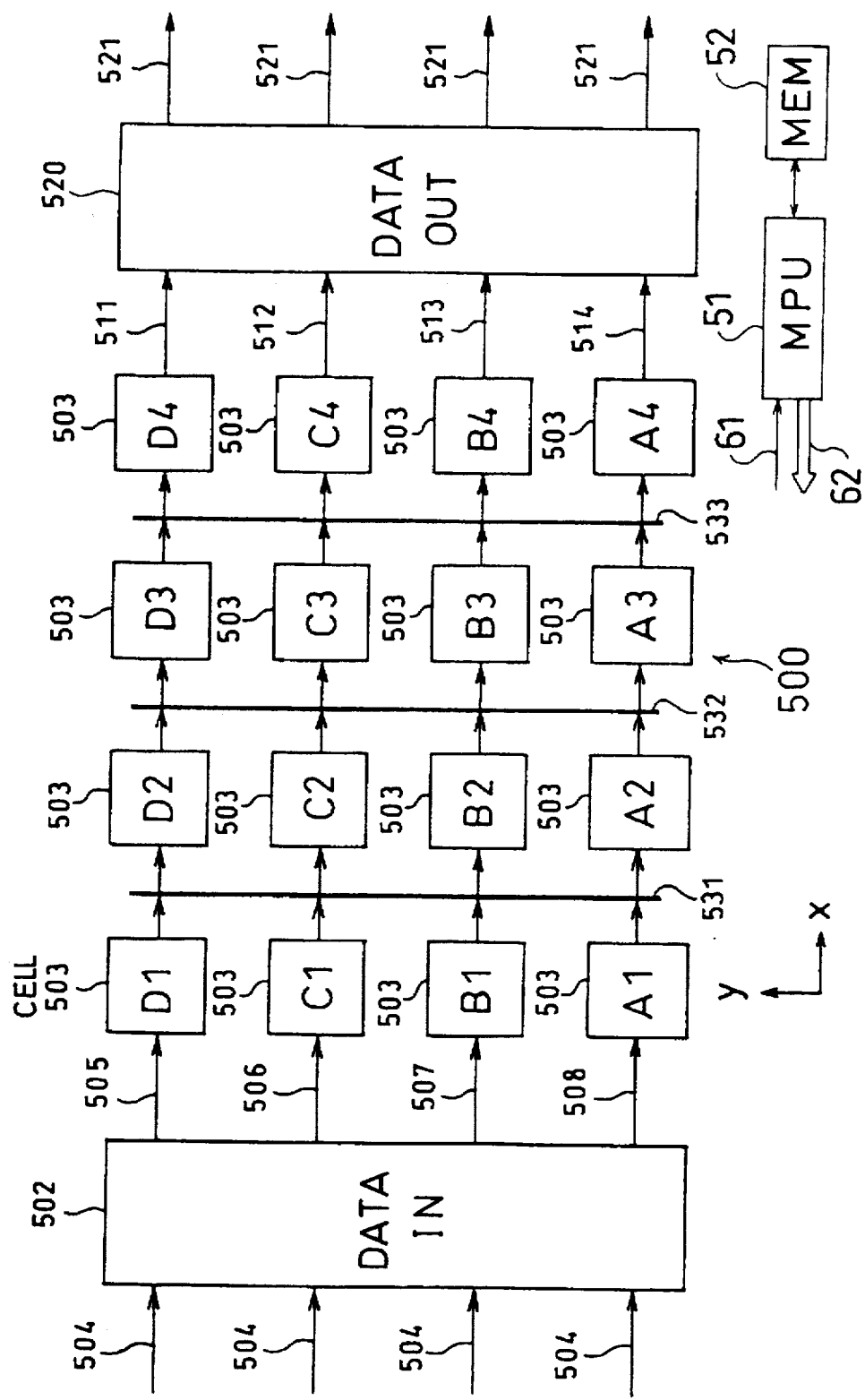
FIG. 11 illustrates in block form a signal processor in accordance with the fifth embodiment of the present invention.

FIG. 11 illustrates in block form an image processor in accordance with the fifth embodiment of the present invention. 500 is an array of sixteen arithmetic cells 503 capable of concurrently operating and each CELL 503 is specified by a denotation of E[x,y] where $1 \leq x \leq 4$ and $1 \leq y \leq 4$. CELLS 503 that are specified by E[1,y] where $1 \leq y \leq 4$ are called A1, B1, C1, and D1, respectively. CELLS 503 that are specified by E[2,y] where $1 \leq y \leq 4$ are called A2, B2, C2, and D2, respectively. CELLS 503 that are specified by E[3,y] where $1 \leq y \leq 4$ are called A3, B3, C3, and D3, respectively. CELLS 503 that are specified by E[4,y] where $1 \leq y \leq 4$ are called A4, B4, C4, and D4, respectively. The first-column arithmetic cells (A1, B1, C1, D1) and the second-column arithmetic cells (A2, B2, C2, D2) face each other across first TDM (time division multiplex) common bus 531, thereby enabling transferring of data from any one of the first-column arithmetic cells to any one of the second-column arithmetic cells. Arranged between the second-column arithmetic cells (A2, B2, C2, D2) and the third-column arithmetic cells (A3, B3, C3, D3) is second TDM common bus 532. Likewise, arranged between the third-column arithmetic cells (A3, B3, C3, D3) and the fourth-column arithmetic cells (A4, B4, C4, D4) is third TDM common bus 533.

Arithmetic array 500 receives data from data-in part 502, performs arithmetic operations on the data received, and provides the result to data-out part 520. Data-in part 502 receives at its four inputs 504 external data signals (pixel signals). Transferring of data from data-in part 502 to CELL D1 is performed over BUS 505. Transferring of data from data-in part 502 to CELL C1 is performed over BUS 506. Transferring of data from data-in part 502 to CELL B1 is performed over BUS 507. Transferring of data from data-in part 502 to CELL A1 is performed over BUS 508. Transferring of data from CELL D4 to data-out part 520 is performed over BUS 511. Transferring of data from CELL C4 to data-out part 520 is performed over BUS 512. Transferring of data from CELL B4 to data-out part 520 is performed over BUS 513. Transferring of data from CELL A4 to data-out part 520 is performed over BUS 514. Data-out part 520 provides data signals (pixel signals) at its four outputs 521. The FIG. 11 image processor further includes MPU 51 and memory 52 which are detailed later.

Figure 12:
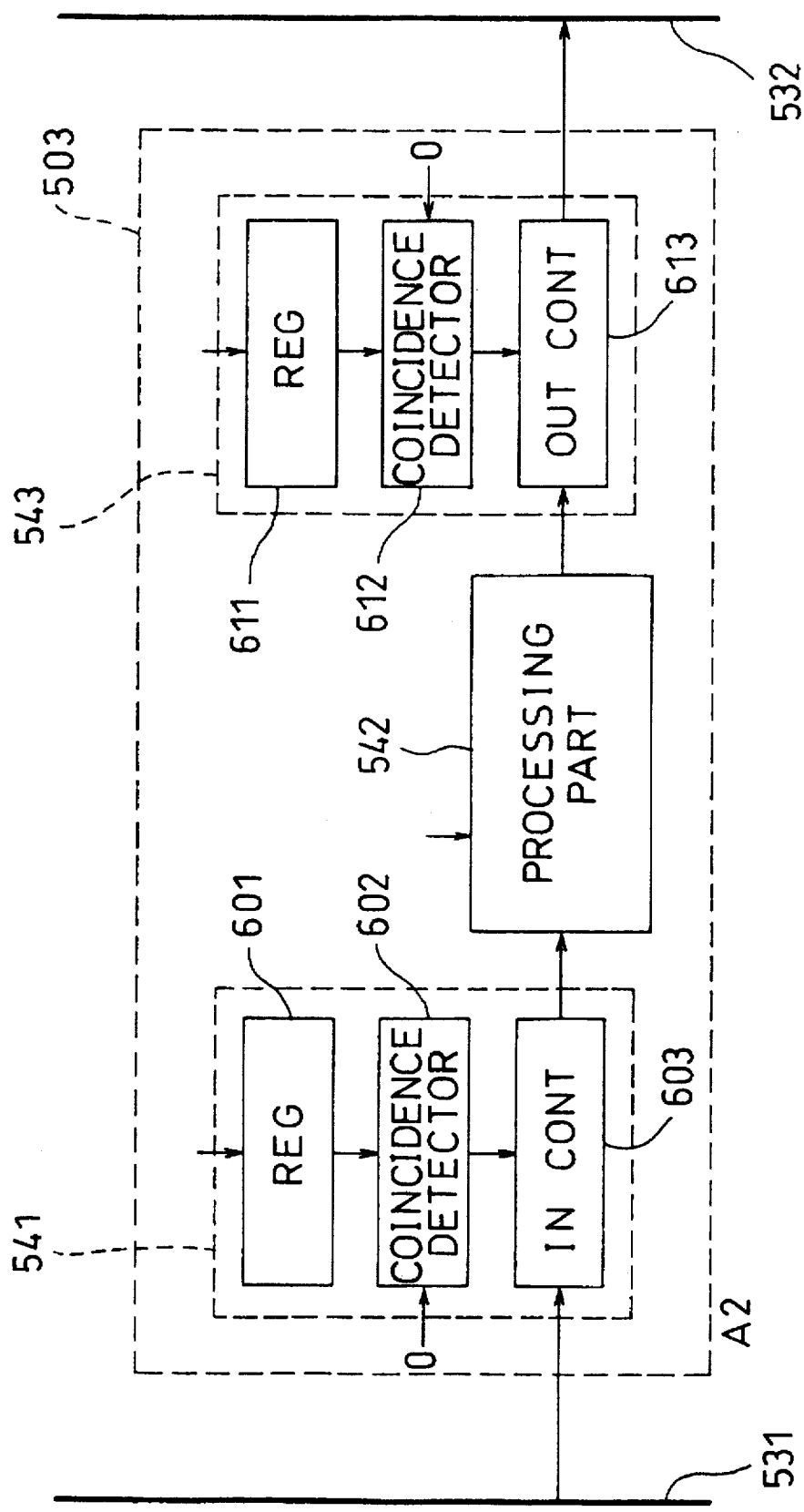
FIG. 12 shows an example of the internal structure of the FIG. 11 arithmetic cell.

Referring now to FIG. 12, there is illustrated the internal structure of the arithmetic cell A2 of FIG. 11. 541 is an input timing part. 542 is a processing part. 543 is an output timing part. Input timing part 541, comprised of register 601 capable of being rewritten, coincidence detector 602, and input controller 603, inputs data from first TDM common bus 531 when a value set in register 601 and a value (e.g., 0) preassigned to coincidence detector 602 agree. Processing part 542, comprised of a coefficient register, a multiplier, and an adder (not shown in the figure), performs multiply-add operations on data from input timing part 541 and provides the result to output timing part 543. Output timing part 543, comprised of register 611 capable of being rewritten, coincidence detector 612, and output controller 613, outputs data onto second TDM common bus 532 when a value set in register 611 and a value preassigned to coincidence detector 612 (e.g., 0) agree. The other remaining arithmetic cells 503 of FIG. 11 each have the same internal structure as CELL A2 of FIG. 12. CELLS D1, C1, B1, and A1 in the first column of the array 500 do not necessarily need input timing part 541. CELLS D4, C4, B4, and A4 in the fourth column of the array 500 do not necessarily need output timing part 543.

MPU 51 of FIG. 11, upon receipt of a processing switch request signal at control input 61, sets coefficients to coefficient registers (not shown in the figure) of the sixteen arithmetic cells 503, through BUS 62. MPU 51 further sets constants to registers 601 and 611 of the sixteen arithmetic cells 503, through BUS 62. Memory 52 stores programs that MPU 51 executes in response to the processing switch request signal, programs that MPU 51 executes for the setting of constants to registers 601 and 611, and data for use in the aforesaid setting.

Figure 14:
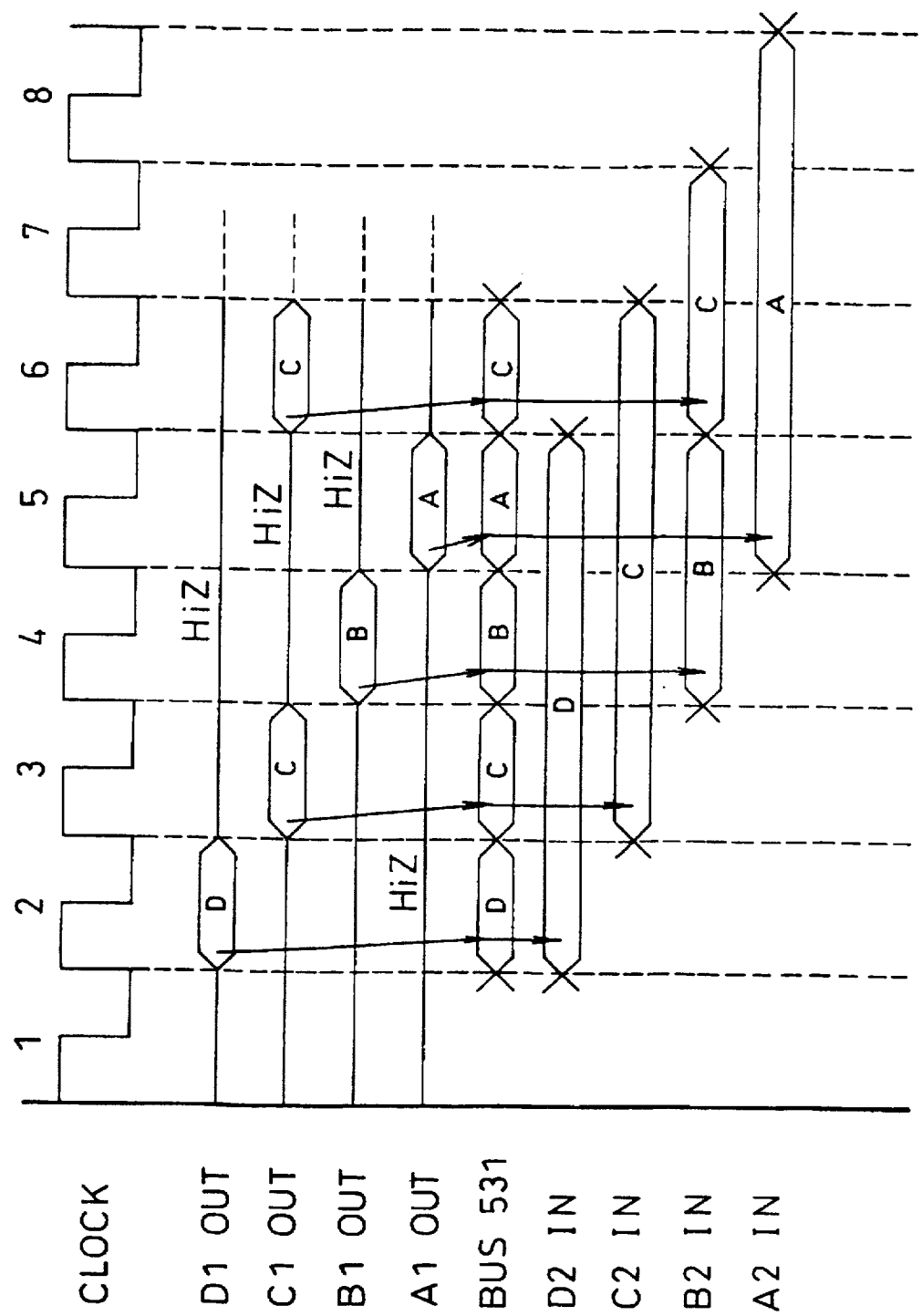
FIG. 14 is a timing diagram useful in understanding the operation of FIG. 11 signal processor.

FIG. 14 is a timing diagram useful in understanding the operation of the FIG. 11 image processor. FIG. 14 shows five examples of the data transferring between each arithmetic cell by way of first TDM common bus 531 (D1→D2, C1→C2, B1→B2, A1→A2, and C1→B2). "HiZ" indicates that the output of CELL is in the state of high impedance.

On a first clock cycle, pixel data are supplied to CELLS D1, C1, B1, and A1 in the first column.

On a second clock cycle, in the first column, registers 611 of CELLS D1, C1, B1, and A1 are set at 0, 3, 2, and 1, respectively. In the second column, registers 601 of CELLS D2, C2, B2, and A2 are set at 0, 3, 2, and 1, respectively. As a result of such setting, CELL D1 provides DATA D onto first TDM common bus 531 for forwarding to CELL D2, during which the outputs of CELLS C1, B1, and A1 in the first column are maintained at the HiZ state.

On a third clock cycle, in the first column, registers 611 of CELLS D1, C1, B1, and A1 are set at 1, 0, 3, and 2, respectively. In the second column, registers 601 of CELLS D2, C2, B2, and A2 are set at 1, 0, 3, and 2, respectively. As a result of such setting, CELL C1 provides DATA C onto first TDM common bus 531 for forwarding to CELL C2, during which the outputs of CELLS D1, B1, and A1 in the first column are maintained at the HiZ state.

On a fourth clock cycle, in the first column, registers 611 of CELLS D1, C1, B1, and A1 are set at 2, 1, 0, and 3, respectively. In the second column, registers 601 of CELLS D2, C2, B2, and A2 are set at 2, 1, 0, and 3, respectively. As a result of such setting, CELL B1 provides DATA B onto first TDM common bus 531 for forwarding to CELL B2, during which the outputs of CELLS D1, C1, and A1 in the first column are maintained at the HiZ state.

On a fifth clock cycle, in the first column, registers 611 of CELLS D1, C1, B1, and A1 are set at 3, 2, 1, and 0, respectively. In the second column, registers 601 of CELLS D2, C2, B2, and A2 are set at 3, 2, 1, and 0, respectively. As a result of such setting, CELL A1 provides DATA A onto first TDM common bus 531 for forwarding to CELL A2, during which the outputs of CELLS D1, C1, and B1 in the first column are maintained at the HiZ state.

On a sixth clock cycle, in the first column, registers 11 of CELLS D1, C1, B1, and A1 are set at 1, 0, 3, and 2, respectively. In the second column, registers 601 of CELLS D2, C2, B2, and A2 are set at 2, 1, 0, and 3, respectively. As a result of such setting, CELL C1 again provides DATA C onto first TDM common bus 531 for forwarding to CELL B2, during which the outputs of CELLS D1, B1, and A1 in the first column are maintained at the HiZ state.

As described above, in accordance with the FIG. 11 image processor, transferring of data between the first-column arithmetic cells (D1, C1, B1, A1) and the second-column arithmetic cells (D2, C2, B2, A2) is performed in a time division multiple fashion through first TDM common bus 531. Second and third TDM common buses 532 and 533 each operate the same way that first TDM common bus 531 operates. Therefore, for example, the FIG. 4 data flow can be achieved in the present embodiment, whereupon 4-tap horizontal filter processing is performed. If a line memory is incorporated in data-in part 502, this will achieve a vertical filter.

Figure 13:
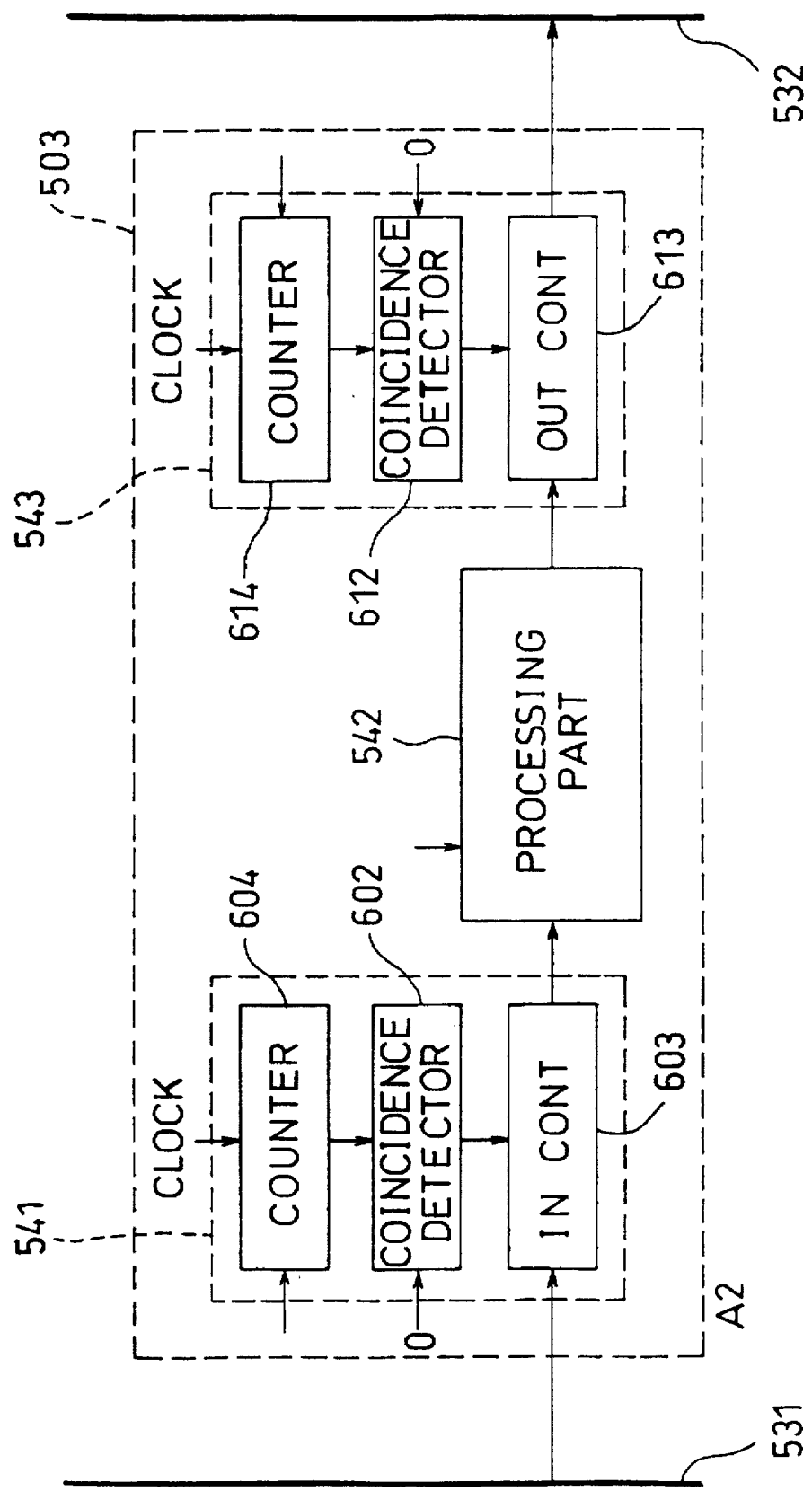
FIG. 13 shows another example of the internal structure of the FIG. 11 arithmetic cell.

Additionally, it may be arranged such that one arithmetic cell transfers data simultaneously to a plurality of other arithmetic cells. Further, at least one of registers 601 and 611 may be replaced with a counter that is increased for every clock cycle. FIG. 13 shows an example in which registers 601 and 611 are replaced with counters 604 and 614. Each of these counters 604 and 614 is formed of two bits since arithmetic array 500 has a 4-row cell structure. The FIG. 13 structure produces the advantage that, once counters 604 and 614 are initialized by MPU 51, transfer of data in a time division multiple fashion can be performed just by application of clock pulses to counters 604 and 614.

EMBODIMENT 6

Figure 15:
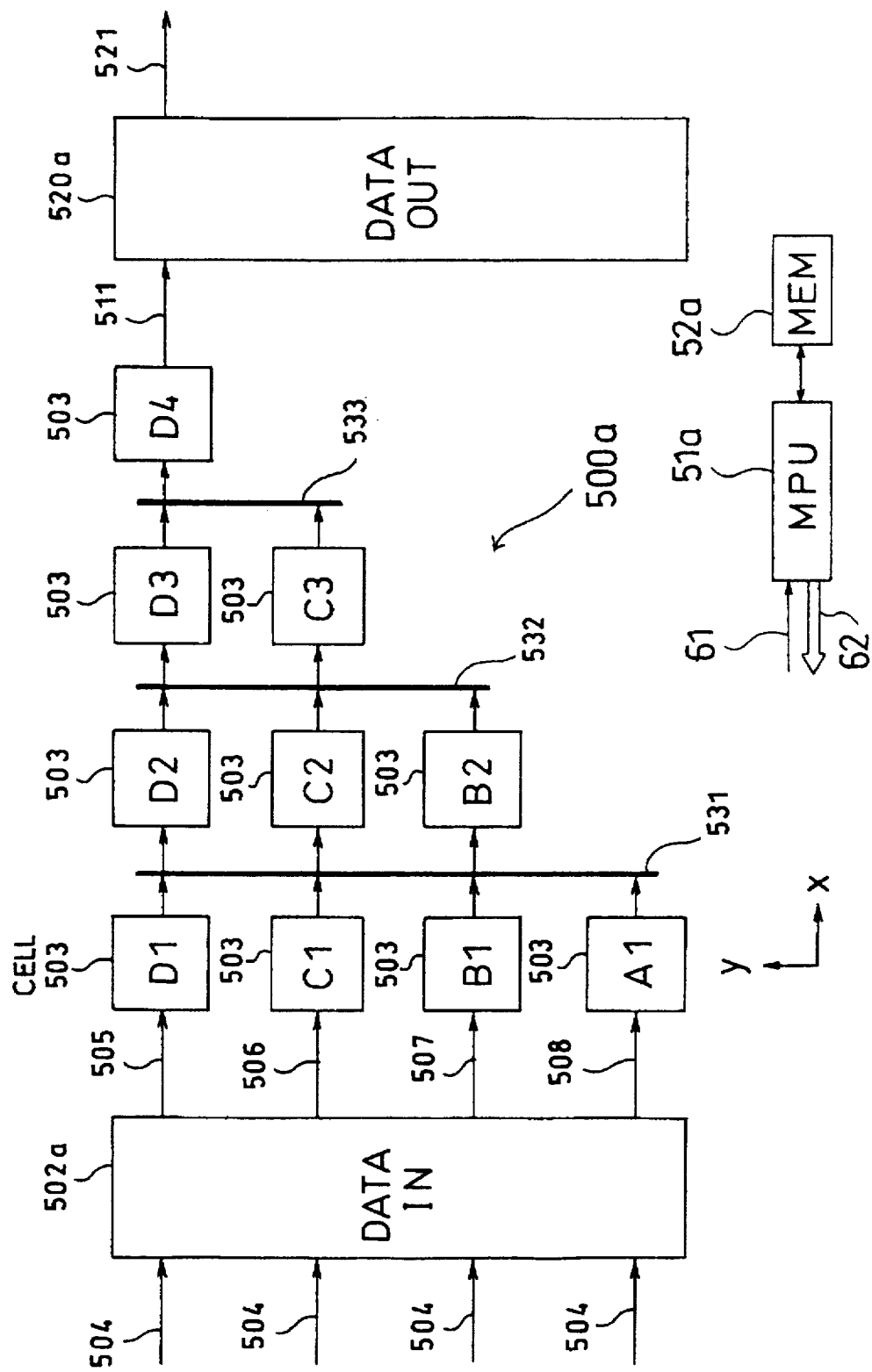
FIG. 15 illustrates in block form a signal processor in accordance with the sixth embodiment of the present invention.

FIG. 15 illustrates in block form an image processor in accordance with the sixth embodiment of the present invention. 500a is an array of ten arithmetic cells 503 capable of concurrently operating, and each CELL 503 is specified by a denotation of E[x,y] where $1 \leq x \leq 4$ and $x \leq y \leq 4$. CELLS 503 that are arranged in the first column and specified by E[1,y] where $1 \leq y \leq 4$, are called A1, B1, C1, and D1, respectively. CELLS 503 that are arranged in the second column and specified by E[2,y] where $2 \leq y \leq 4$, are called B2, C2, and D2, respectively. CELLS 503 that are arranged in the third column and specified by E[3,y] where $3 \leq y \leq 4$, are called C3 and D3, respectively. Finally, CELL 503 that is arranged in the fourth column and specified by E[4,4], is called D4. The first-column arithmetic cells (A1, B1, C1, D1) and the second-column arithmetic cells (B2, C2, D2) face each other across first TDM common bus 531, thereby enabling transferring of data from any one of the first-column arithmetic cells to any one of the second-column arithmetic cells. Arranged between the second-column arithmetic cells (B2, C2, D2) and the third-column arithmetic cells (C3, D3) is second TDM common bus 532. Likewise, arranged between the third-column arithmetic cells (C3, D3) and the fourth-column arithmetic cell (D4) is third TDM common bus 533.

Arithmetic array 500a receives data from data-in part 502a, performs arithmetic operations on the data received, and provides the result to data-out part 520a. Data-in part 520a receives at its four inputs 504 external data signals (pixel signals). Transferring of data from data-in part 502a to CELL D1 is performed over BUS 505. Transferring of data from data-in part 502a to CELL C1 is performed over BUS 506. Transferring of data from data-in part 502a to CELL B1 is performed over BUS 507. Transferring of data from data-in part 502a to CELL A1 is performed over BUS 508. Transferring of data from CELL D4 to data-out part 520a is performed over BUS 511. Data-out part 520a provides a data signal (pixel signal) at its output 521.

Each arithmetic cells 503 of FIG. 15 has either an internal structure shown in FIG. 12 or an internal structure shown in FIG. 13. The first-column cells D1, C1, B1, and A1 do not necessarily need an input timing part 541. Further, the fourth-column arithmetic cell D4 may need neither input timing part 541 nor output timing part 543. The FIG. 15 image processor further includes MPU 51a and memory 52a for, for example, the setting of coefficients to coefficient registers incorporated in each arithmetic cell 503.

In accordance with the FIG. 15 image processor, for example, the FIG. 9 data flow can be achieved through first to third TDM common buses 531–533.

EMBODIMENT 7

Figure 16:
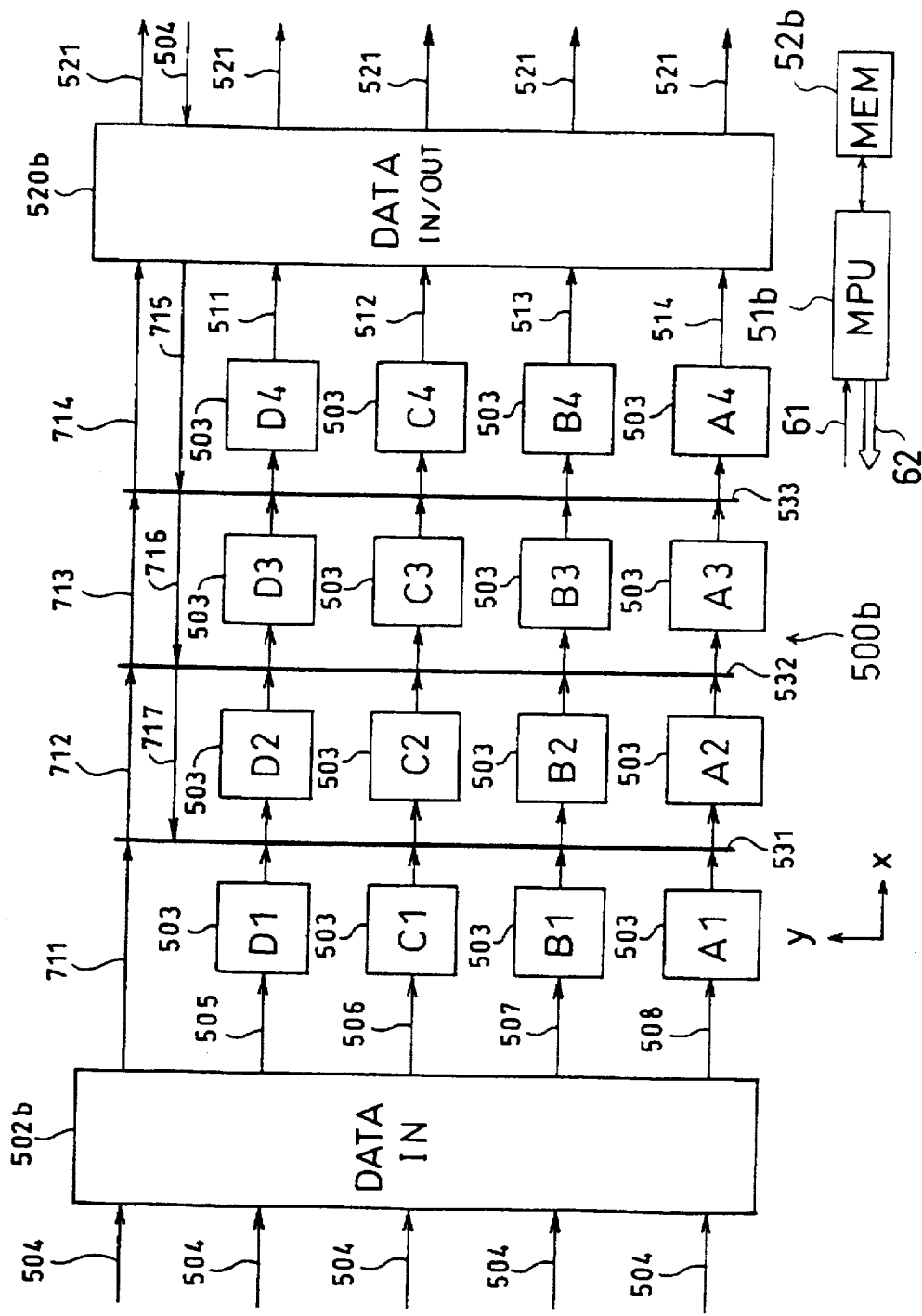
FIG. 16 illustrates in block form a signal processor in accordance with the seventh embodiment of the present invention.

FIG. 16 illustrates in block form an image processor in accordance with the seventh embodiment of this invention. Referring to FIG. 16, there is shown an image processor structure resulting from adding seven bypass busses to the FIG. 11 structure.

500b is an array of 4 by 4 arithmetic cells 503. First TDM common bus 531 lies between the first-column cells and the second-column cells. Second TDM common bus 532 lies between the second-column cells and the third-column cells. Third TDM common bus 533 lies between the third-column cells and the fourth-column cells.

Arithmetic array 500b performs arithmetic operations on data from data-in part 502b and provides the result to data-in/out (DIO) part 520b. Data-in part 502b receives external data signal (pixel signals) at its five inputs 504. Transferring of data from data-in part 502b to CELL D1 is performed over BUS 505. Transferring of data from data-in part 502b to CELL C1 is performed over BUS 506. Transferring of data from data-in part 502b to CELL B1 is performed over BUS 507. Transferring of data from data-in part 502b to CELL A1 is performed over BUS 508. Transferring of data from CELL D4 to DIO part 520b is performed over BUS 511. Transferring of data from CELL C4 to DIO part 520b is performed over BUS 512. Transferring of data from CELL B4 to DIO part 520b is performed over BUS 513. Transferring of data from CELL A4 to DIO part 520b is performed over BUS 514. First bypass bus 711 provides a path connecting data-in part 502b and first TDM bus 531, whereupon data are direct-transferred from data-in part 502b to the second-column arithmetic cells (D2, C2, B2, A2). Second bypass bus 712 provides a path connecting first TDM common bus 531 and second TDM common bus 532, whereupon data are direct-transferred from the first-column arithmetic cells (D1, C1, B1, A1) to the third-column arithmetic cells (D3, C3, B3, A3). In addition, third bypass bus 713 is provided which extends from second TDM common bus 532 to third TDM common bus 533, and fourth bypass bus 714 is provided which extends from third TDM common bus 533 to DIO part 520b. DIO part 520b has five outputs 521 at which external data signals (pixel signals) are provided, and one input 504 at which an external data signal (pixel signal) is applied. Fifth bypass bus 715 provides a path connecting DIO part 520b and third TDM common bus 533, whereupon data are transferred from DIO 520b to the fourth-column arithmetic cells (D4, C4, B4, A4). Sixth bypass bus 716 is provided which extends from third TDM common bus 533 to second TDM common bus 532, and seventh bypass bus 717 is provided which extends from second TDM common bus 532 to first TDM common bus 531.

Each of the arithmetic cells 503 forming the arithmetic array 500b is constructed in accordance with the FIG. 12 structure. Register 611 in the output timing part 543 is replaced with a 3-bit counter 614 (see FIG. 13) that counts up to five starting at zero. The FIG. 16 image processor further includes MPU 51b and memory 52b for, for example, the initialization of counter 614 of output timing part 534 incorporated in each arithmetic cell 503.

Figure 17:
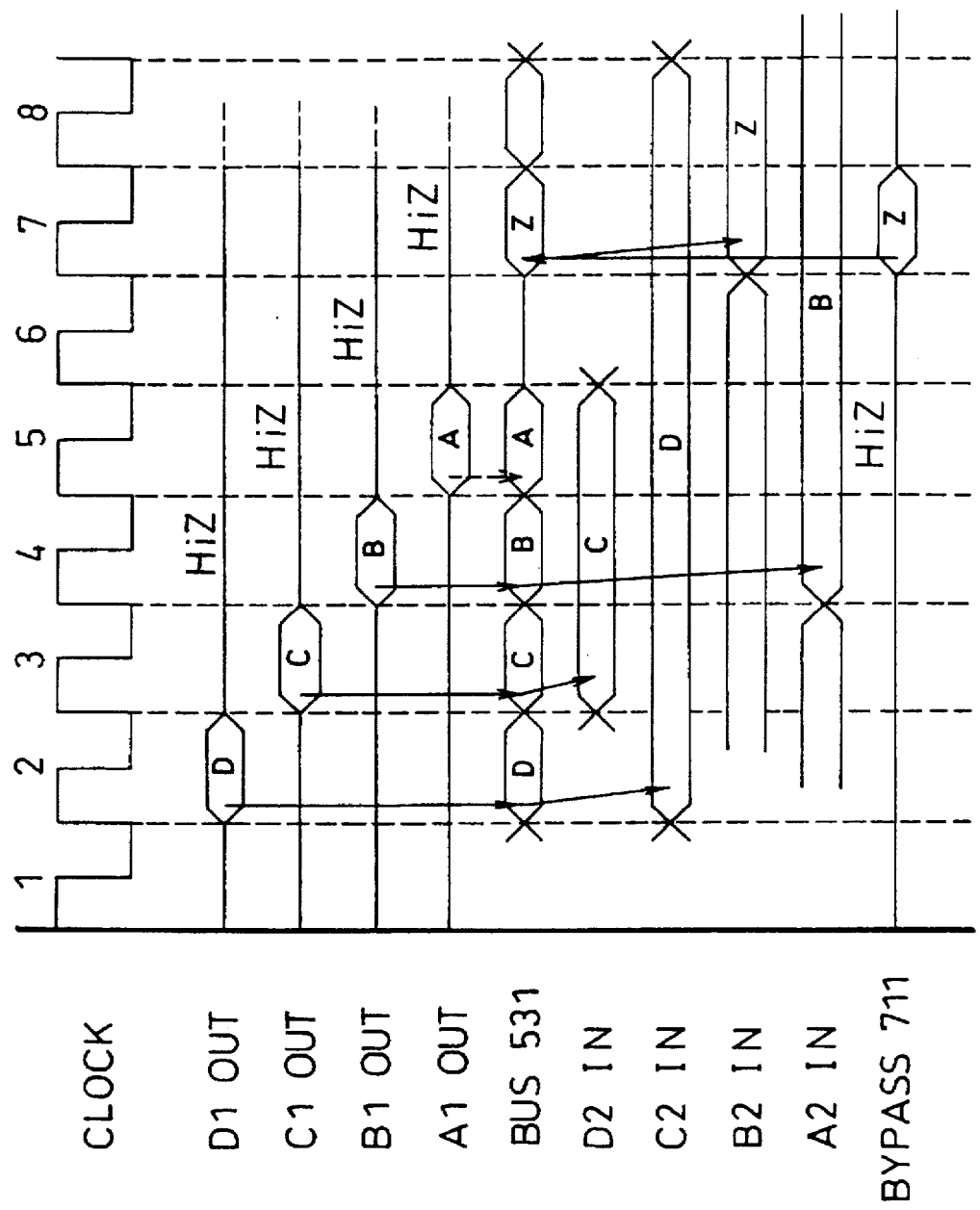
FIG. 17 is a timing diagram useful in understanding the operation of FIG. 16 signal processor.

FIG. 17 is a timing diagram useful in understanding the operation of the FIG. 16 image processor. FIG. 17 shows three examples of the data transfer between each arithmetic cell 503 by way of first TDM common bus 531 (D1→C2, C1→D2, B1→A2) and further shows an example of the data transfer by making use of first bypass bus 711 (data-in part 502b→CELL B2).

On a first clock cycle, pixel data items are fed to the first-column arithmetic cells D1, C1, B1, and A1 for arithmetic operations in parallel.

On a second clock cycle, in the first column, counters 614 of CELLS D1, C1, B1, and A1 are set at 0, 5, 4, and 3, respectively. In the second column, registers 601 of CELLS D2, C2, B2, and A2 are set at 1, 0, 5, and 4, respectively. As a result, CELL D1 provides DATA D onto first TDM common bus 531 for forwarding to CELL C2, during which the outputs of CELLS C1, B1, and A1 in the first column are maintained at the HiZ state.

On a third clock cycle, in the first column, counters 614 of CELLS D1, C1, B1, and A1 are increased to 1, 0, 5, and 4, respectively. In the second column, registers 601 of CELLS D2, C2, B2, and A2 are set at 0, 5, 4, and 3, respectively. As a result, CELL C1 provides DATA C onto first TDM common bus 531 for forwarding to CELL D2, during which the outputs of CELLS D1, B1, and A1 in the first column are maintained at the HiZ state.

On a fourth clock cycle, counters 614 of CELLS D1, C1, B1, and A1 are increased to 2, 1, 0, and 5, respectively. In the second column, registers 601 of CELLS D2, C2, B2, and A2 are set at 3, 2, 1, and 0, respectively. As a result, CELL B1 provides DATA B onto first TDM common bus 531 for forwarding to CELL A2, during which the outputs of CELLS D1, C1, and A1 in the first column are maintained at the HiZ state.

On a fifth clock cycle, counters 614 of CELLS D1, C1, B1, and A1 are increased to 3, 2, 1, and 0, respectively. Registers 601 of CELLS D2, C2, B2, and A2 are set at 4, 3, 2, 1, respectively. As a result, CELL A1 provides DATA A onto first TDM common bus 531 but none of the second-column cells input DATA A, during which the outputs of D1, C1, and B1 in the first column are maintained at the HiZ state.

On a sixth clock cycle, counters 614 of CELLS D1, C1, B1, and A1 are increased to 4, 3, 2, and 1, respectively. Registers 601 of CELLS D2, C2, B2, and A2 are set at 5, 4, 3, and 2, respectively. As a result, the outputs of all the first-column arithmetic cells are maintained at the HiZ state and these first-column arithmetic cells have idle cycling on their output sides. No one arithmetic cell in the second column input data from first TDM common bus 531.

On a seventh clock cycle, counters 614 of D1, C1, B1, and A1 in the first column are increased to 5, 4, 3, and 2, respectively. Registers 601 of D2, C2, B2, and A2 are set at 2, 1, 0, and 5, respectively. As a result, the outputs of all the first-column arithmetic cells are maintained at the HiZ state, and these first-column arithmetic cells have idle cycling on their output sides; however, making use of such idle cycling, data-in part 502b provides DATA Z to first TDM common bus 531 via first bypass bus 711, for forwarding to CELL B2.

As described above, the FIG. 16 image processor not only enables transferring of data from the arithmetic cells in the first column (D1, C1, B1, A1) to the arithmetic cells in the second column (D2, C2, B2, A2), but also enabling transferring of data from data-in part 502b to the arithmetic cells in the second column (D2, C2, B2, A2) via first bypass bus 711. Therefore, while performing 4-tap horizontal filter processing by making use of ten arithmetic cells (A1, B1, C1, D1, B2, C2, D2, C3, D3, D4) that are interconnected by BUSES 531-533, it is possible to transfer data from data-in part 502b to an arithmetic cell that is not used in the aforesaid horizontal filter processing (e.g., CELL A2) by making use of idle cycling. This achieves a high-performance arithmetic array. Accordingly, arithmetic array 500b is able to perform more sophisticated arithmetic operations in comparison with arithmetic array 500 of FIG. 11 having therein no bypass buses. In the present embodiment, idle cycling is in two clock cycles, which, however, is not considered restrictive. Any number of clock cycles may be used for idle cycling.

Further, in accordance with the FIG. 16 image processor, any one of BUSES 712-717 may be available. Particularly, the FIG. 16 structure has BUSES 715, 716, and 717 for data feedback, which facilitates the way of forming cyclic filters.

EMBODIMENT 8

Figure 18:
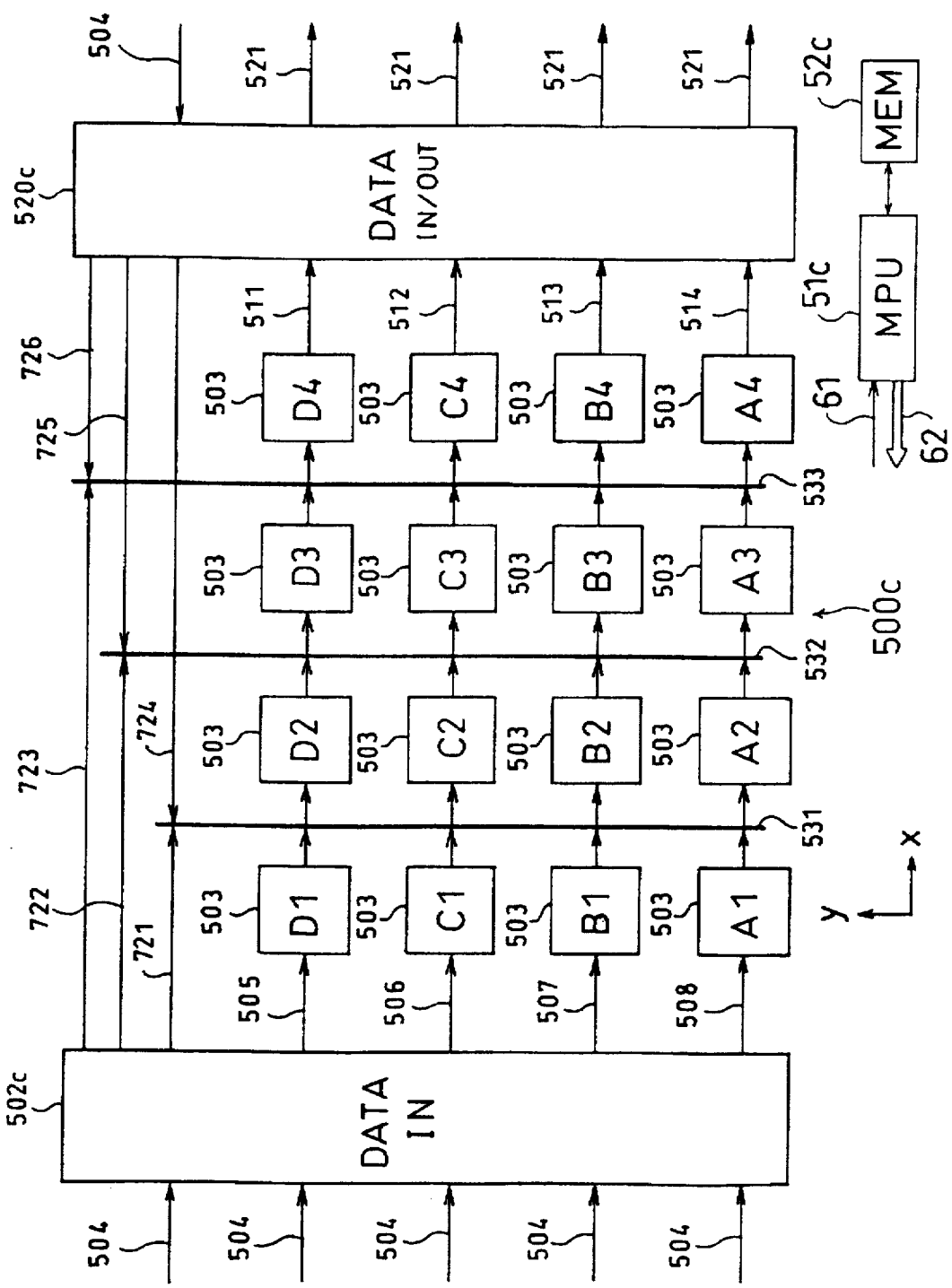
FIG. 18 illustrates in block form a signal processor in accordance with the eighth embodiment of the present invention.

FIG. 18 illustrates in block form an image processor in accordance with the eighth embodiment of this invention. Referring to FIG. 18, there is shown a structure resulting from adding six bypass busses to the FIG. 11 structure.

500c is an array of 4 by 4 arithmetic cells 503. First TDM common bus 531 lies between the first-column cells and the second-column cells, second TDM common bus 532 between the second-column cells and the third-column cells, and third TDM common bus 533 between the third-column cells and the fourth-column cells.

Arithmetic array 500c performs arithmetic operations on data received from data-in part 502c and provides the result to data-in/out (DIO) part 520c. Data-in part 502c receives external data signals (pixel signals) at its five inputs 504. Transferring of data from data-in part 502c to the first-column arithmetic cells (D1, C1, B1, A1) is performed over BUSSES 505-508, respectively, while on the other hand transferring of data from the fourth-column arithmetic cells (D4, C4, B4, A4) to DIO part 520c is performed over BUSES 511-514, respectively. First bypass bus 721 provides a path connecting data-in part 502c and first TDM bus 531, whereupon data are direct-transferred from data-in part 502c to the second-column arithmetic cells (D2, C2, B2, A2) by way of BUS 721 and BUS 531. Second bypass bus 722 provides a path connecting data-in part 502c and second TDM common bus 532, and third bypass bus 723 provides a path connecting data-in part 502c and third TDM common bus 533. DIO part 520c has four outputs 521 at which respective data signals (pixel signals) are provided, and has one input 504 at which an external data signal (pixel signal) is applied. Fourth bypass bus 724 provides a path connecting DIO part 520c and BUS 531, whereupon data are direct-transferred from DIO part 520c to the second-column arithmetic cells (D2, C2, B2, A2). Fifth bypass bus 725 provides a path connecting DIO part 520c and BUS 532, and sixth bypass bus 726 provides a path connecting DIO part 520c and BUS 533. The FIG. 18 image processor further includes MPU 51c and memory 52c which are detailed later.

Figure 19:
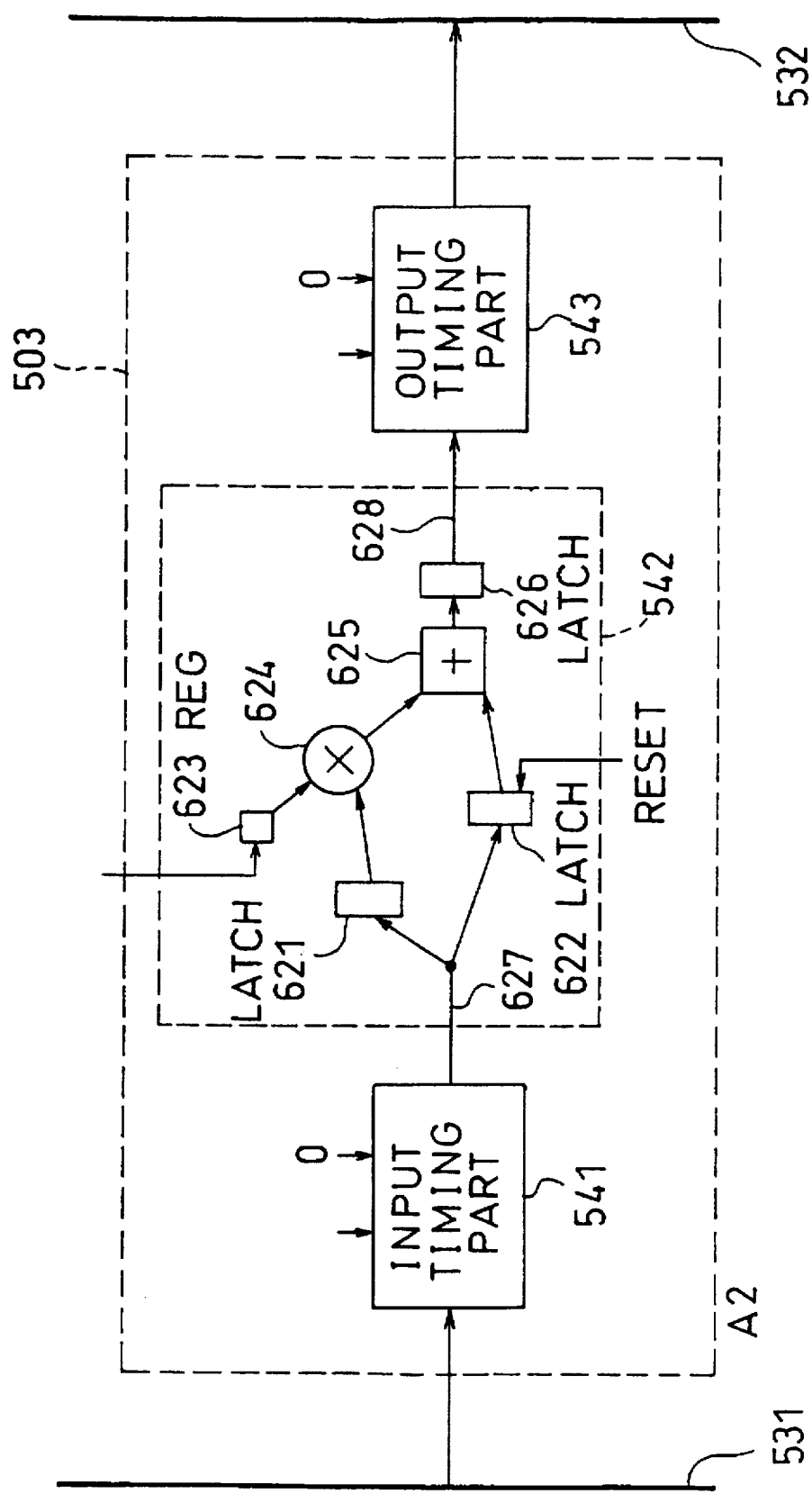
FIG. 19 shows the internal structure of an arithmetic cell of FIG. 18.

Referring now to FIG. 19, there is shown the internal structure of CELL A2. 541 is an input timing part. 542 is a processing part. 543 is an output timing part. Input timing part 541 is constructed in accordance with the FIG. 12 structure or in accordance with the FIG. 13 structure, and, likewise, output timing part 543 is constructed in accordance with the FIG. 12 structure or in accordance with the FIG. 13 structure. Processing part 542, shown in FIG. 19, is formed by first latch 621, second latch 622, coefficient register 623, multiplier 624, adder 625, and third latch 626. First and second latches 621 and 622 each hold data transferred from input timing part 541 by way of input 627. Second latch 622 is a latch capable of being reset to zero. Multiplier 624 produces a product output indicative of the product of a coefficient held in register 623 and an item of data held in first latch 621. Adder 625 produces a sum output indicative of the sum of a product output of multiplier 624 and an item of data held in second latch 622. Third latch 626 holds a sum output from adder 625 for forwarding to output timing part 543 via output 628. The remaining arithmetic cells 503 of FIG. 18 each have the same structure as CELL A2 of FIG. 19. It is to be noted that no one arithmetic cell in the first column necessarily needs an input timing part 541 and no one arithmetic cell in the fourth column necessarily needs an output timing part 543.

MPU 51c shown in FIG. 18, upon receipt of a processing switch request signal at control input 61, sets coefficients to coefficient registers 623 of the sixteen arithmetic cells 503, through BUS 62. MPU 51c further sets constants to registers (counters) of input timing parts 541 and to registers (counters) of output timing parts 543. Memory 52c stores programs that MPU 51c executes in response to the processing switch request signal, programs that MPU 51c executes for the setting of constants to the registers (counters), and data for use in the aforesaid setting.

The internal structure of the data-in part 502c by which the FIG. 18 image processor operates as an apparatus which combines the functions of a 2-tap horizontal filter and a 2-tap vertical filter and which has a function of synthesizing the outputs of the 2-tap horizontal and vertical filters, is the same structure as the one shown in FIG. 7. In this case, PIXEL DATA h3 that is one line ahead of PIXEL DATA g3 to be supplied to CELL D1, is supplied to CELL C1, and PIXEL DATA h1, h2, and h3, arranged in the horizontal direction, are supplied to respective arithmetic cells (A1, B1, and C1).

Figure 20:
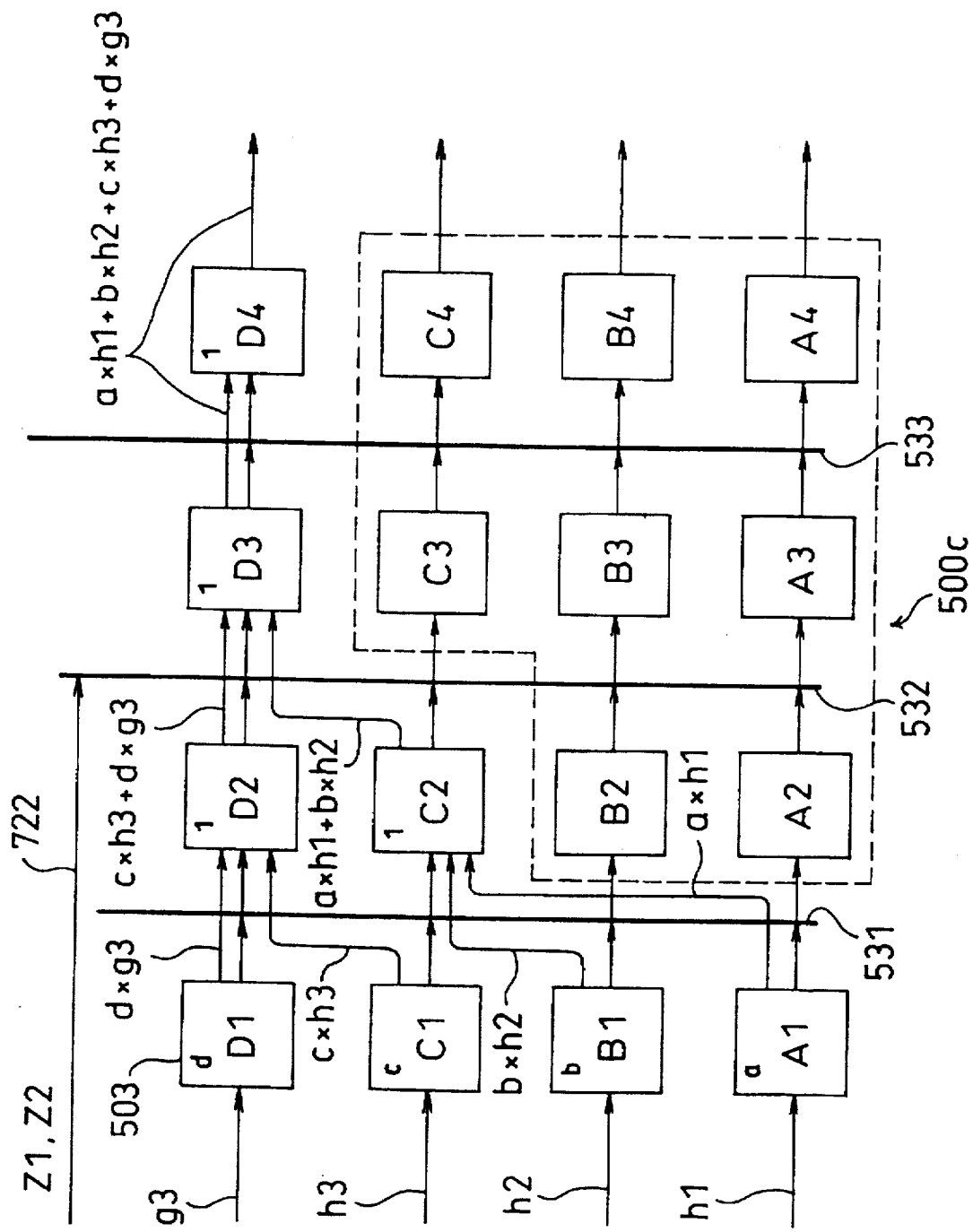
FIG. 20 is a diagram useful in understanding the operation of the FIG. 18 signal processor.

FIG. 20 is a diagram useful in understanding the operation of arithmetic array 500c whose data-in part 502c employs the same internal structure as the one shown in FIG. 7. The setting of coefficients to each of coefficient registers 623 is performed as follows. Coefficient registers 623 of the first-column arithmetic cells (A1, B1, C1, D1) are set such that they have coefficients of a, b, c, and d respectively. Coefficient registers 623 of the arithmetic cells C2 and D2, D3, and D4 are set such that they have coefficients of 1, 1, 1, and 1, respectively. Second latches 622 of the arithmetic cells A1, B1, C1, D1, and D4 are previously reset to zeroes.

CELLS A1, B1, C1, and D1 in the first column receive, from data-in part 502c, PIXEL DATA h1, h2, h3, and g3, respectively. CELLS D1, C1, B1, and A1 sequentially provide, onto first TDM common bus 531, d×g3, c×h3, b×h2, and a×h1, respectively. In CELL D2, first latch 621 receives d×g3 from CELL D1 and second latch 622 receives c×h3 from CELL C1, as a result of which CELL D2 outputs c×h3+d×g3 onto second TDM common bus 532. In CELL C2, first latch 621 receives b×h2 from CELL B1 and second latch 622 receives a×h1 from CELL A1, as a result of which CELL C2 outputs a×h1+b×h2 onto second TDM common bus 532. Here, whereas the output data of CELL C2 (a×h1+b×h2) represents a 2-tap horizontal filter processing result, the output data of CELL D2 (c×h3+d×g3) represents a 2-tap vertical filter processing result.

In CELL D3, first latch 621 receives c×h3+d×g3 from CELL D2 and second latch 622 receives a×h1+b×h2 from CELL C2, as a result of which CELL D3 outputs a×h1+b×h2+c×h3+d×g3 onto third TDM common bus 533. CELL D4 receives, from CELL D3, a×h1+b×h2+c×h3+d×g3 that is transferred unchanged to DIO part 520c. The output data of CELL D4 (a×h1+b×h2+c×h3+d×g3), as a synthetic result of a 2-tap horizontal filter processing result and a 2-tap vertical filter processing result, is provided from DIO part 520c.

As described above, in accordance with the FIG. 18 image processor, a group of CELLS A1, B1, and C2 operates independently of a group of CELLS C1, D1, and D2, whereupon a 2-tap horizontal filter processing operation and a 2-tap vertical filter processing operation are executed in parallel. Additionally, results of such 2-tap horizontal and vertical filter processing operations are synthesized by CELLS D3 and D4.

In the above-described image processing, however, CELLS A2, B2, A3, B3, C3, A4, B4, and C4, enclosed by the broken line in the figure, have not been used. For effective use of these eight cells, the FIG. 18 image processor is provided with first to sixth bypass buses 721–726.

Figure 21:
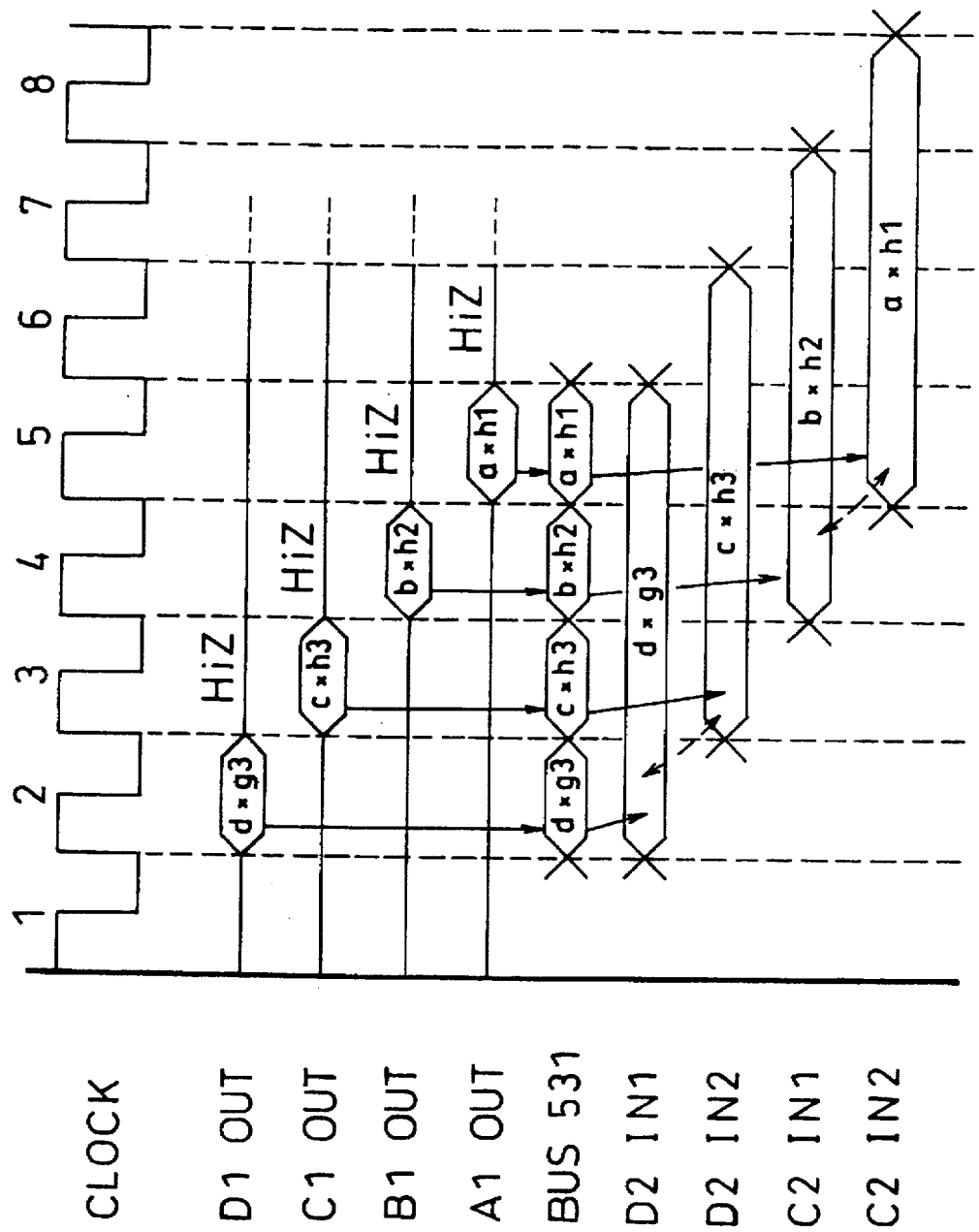
FIG. 21 is a timing diagram useful in understanding the operation of the FIG. 18 signal processor.
Figure 22:
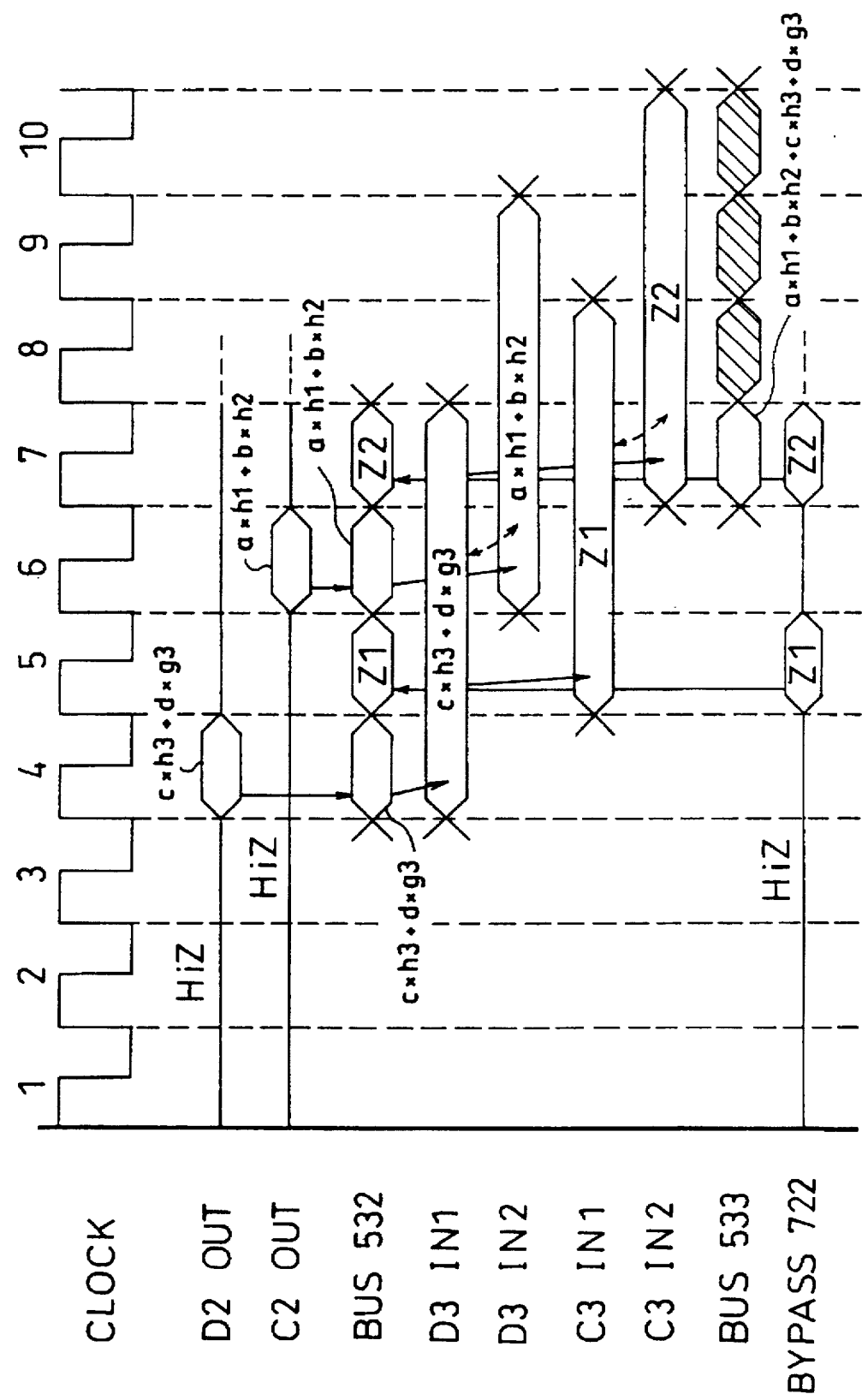
FIG. 22 is a timing diagram conjunctive to FIG. 21.

FIGS. 21 and 22 are timing diagrams useful in understanding the operation of the FIG. 18 image processor and show examples of the use of second bypass bus 722 during the foregoing processing (horizontal/vertical filter processing and synthetic processing).

On a first clock cycle, each of CELLS D1, C1, B1, and A1 in the first column is fed a respective pixel data item and these pixel data items are processed in parallel.

On a second clock cycle, CELL D1 outputs a data item of d ×g3 onto BUS 531 and this data item is then applied as input to first latch 621 of CELL D2.

On a third clock cycle, CELL C1 outputs a data item of c ×h3 onto BUS 531 and this data item is then applied as input to second latch 622 of CELL D2. Upon receipt of the two data items (d×g3 and c×h3), CELL D2 performs arithmetic operations thereon.

On a fourth clock cycle, CELL B1 outputs a data item of b ×h2 onto BUS 531 and this data item is then applied as input to first latch 621 of CELL C2. On the other hand, CELL D2 outputs a data item of c×h3+d×g3 onto BUS 532 and this data is then applied as input to first latch 621 of CELL D3. On a fifth clock cycle, CELL A1 outputs a data item of a ×h1 onto BUS 531 and this data item is then applied as input to second latch 622 of CELL C2. Upon receipt of the two data items (b×h2 and a×h1), CELL C2 performs arithmetic operations thereon. The outputs of all the second-column arithmetic cells are maintained at the HiZ state, and these second-column arithmetic cells have idle cycling on their output sides; however, making use of this idle cycling, data-in part 502c provides DATA Z1 to BUS 532 via BUS 722. This DATA Z1 is fed to first latch 621 of CELL C3.

On a sixth clock cycle, CELL C2 outputs a data item of a ×h1+b×h2 onto BUS 532 and this data item is then applied as input to second latch 622 of CELL D3. Upon receipt of the two data items (c×h3+d×g3 and a×h1+b ×h2), CELL D3 performs arithmetic operations thereon.

On a seventh clock cycle, the outputs of all the second-column arithmetic cells are maintained at the HiZ state, and these second-column arithmetic cells have idle cycling on their output sides; however, making use of this idle cycling, data-in part 502c provides DATA Z2 to BUS 532 via BUS 722. This DATA Z2 is fed to second latch 622 of CELL C3. Upon receipt of the two data items (Z1 and Z2), CELL C3 performs arithmetic operations thereon. Meanwhile, CELL D3 provides a data item of a×h1+b×h2+c×h3+d×g3 onto BUS 533 and this data item is then fed to CELL D4.

From an eighth clock cycle onward, CELL C3 is able to use BUS 533 as its data output path.

As described above, the FIG. 18 image processor not only enables transferring of data from the arithmetic cells in the second column (D2, C2, B2, A2) to the arithmetic cells in the third column (D3, C3, B3, A3), but also enables direct transferring of data from data-in part 502c to the arithmetic cells in the third column (D3, C3, B3, A3) by way of BUS 722. Therefore, while performing horizontal filter processing, vertical filter processing, and synthetic processing by making use of eight arithmetic cells (A1, B1, C1, D1, C2, D2, D3, D4) which are interconnected by BUSES 531–533, it is possible to transfer data from data-in part 502c to an arithmetic cell that is not used in the aforesaid processing (e.g., CELL C3) by making use of idle cycling. This achieves a high-performance arithmetic array. Therefore, arithmetic array 500c is able to perform more sophisticated arithmetic operations in comparison with arithmetic array 500 of FIG. 11 having no bypass buses.

Further, in accordance with the FIG. 18 image processor, any one of BUSES 721 and 723–726 may be available. Particularly, the FIG. 18 structure has BUSES 724, 725, and 726 for data feedback, which facilitates the formation of cyclic filters.

EMBODIMENT 9

Figure 23:
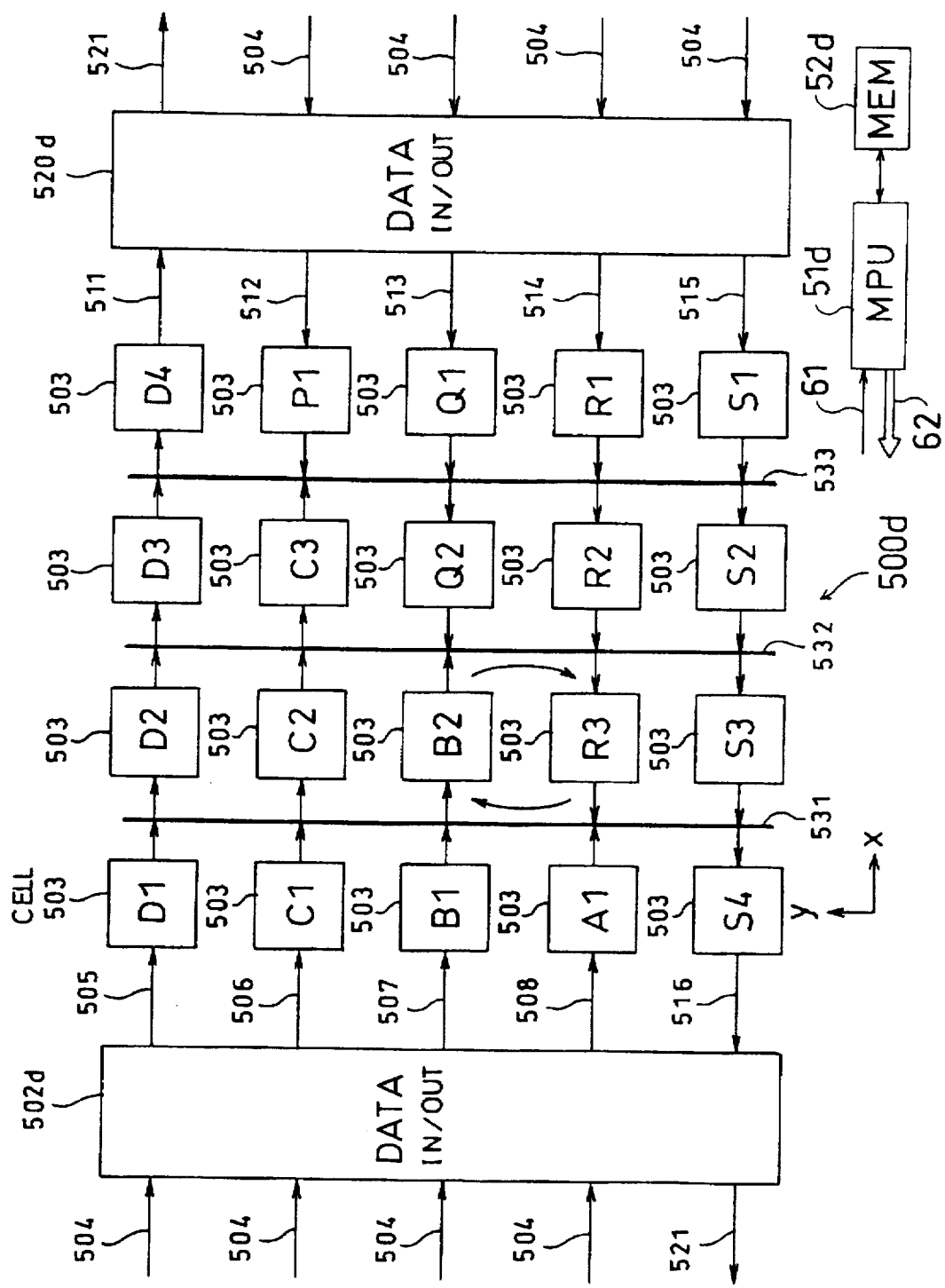
FIG. 23 illustrates in block form a signal processor in accordance with the ninth embodiment of the present invention.

FIG. 23 is a block diagram illustrating an image processor in accordance with the ninth embodiment of this invention. 500d is an array of twenty concurrently operable arithmetic cells 503, and each CELL 503 is specified by a denotation of E[x,y] where $1 \leq x \leq 4$ and $1 \leq y \leq 5$. Arithmetic array 500d performs arithmetic operations on data received from first DIO (data-in/out) part 502d and provides the result of the arithmetic operation to second DIO part 520d. Further arithmetic array 500d performs arithmetic operations on data received from second DIO part 520d and provides the result of the arithmetic operation to first DIO part 502d. Like FIG. 10, CELLS 503 in the first column that are specified by E[1,y] where $2 \leq y \leq 5$, are called A1, B1, C1 and D1, respectively. CELLS 503 in the second column that are specified by E[2,y] where $3 \leq y \leq 5$, are called B2, C2, and D2, respectively. CELLS 503 in the third column that are specified by E[3,y] where $4 \leq y \leq 5$, are called C3 and D3, respectively. CELL 503 in the fourth column that is specified by E[4,5], is called D4. The remaining four arithmetic cells 503 in the fourth column that are specified by E[4,y] where $4 \leq y \leq 1$, are called P1, Q1, R1 and S1, respectively. The remaining three arithmetic cells 503 in the third column that are specified by E[3,y] where $3 \geq y \geq 1$, are called Q2, R2 and S2, respectively. The remaining two arithmetic cells 503 in the second column that are specified by E[2,y] where $2 \geq y \geq 1$, are called R3 and S3, respectively. Finally, the remaining arithmetic cell 503 in the first column that is specified by E[1,1], is called S4.

Whereas first DIO part 502d receives external data signals (pixel signals) at its four inputs 504, second DIO part 520d receives external data signals (pixel signals) at its four inputs 504. Transferring of data from first DIO 502d to CELLS D1, C1, B1, and A1 in the first column of arithmetic array 500d is performed over BUSES 505, 506, 507, and 508, respectively. Transferring of data from second DIO 520d to CELLS P1, Q1, R1, and S1 in the fourth column is performed over BUSES 512, 513, 514, and 515, respectively. First TDM common bus 531 is arranged between the first-column arithmetic cells (S4, A1, B1, C1, D1) and the second-column arithmetic cells (S3, R3, B2, C2, D2), thereby enabling transferring of data from any one of CELLS A1, B1, C1, D1, R3, S3 to any one of CELLS B2, C2, D2, S4. Second TDM common bus 532 is arranged between the second-column arithmetic cells (S3, R3, B2, C2, D2) and the third-column arithmetic cells (S2, R2, Q2, C3, D3), thereby enabling transferring of data from any one of CELLS B2, C2, D2, Q2, R2, S2 to any one of CELLS C3, D3, R3, S3. Third TDM common bus 533 is arranged between the third-column arithmetic cells (S2, R2, Q2, C3, D3) and the fourth-column arithmetic cells (S1, R1, Q1, P1, D4), thereby enabling transferring of data from any one of CELLS C3, D3, P1, Q1, R1, S1 to any one of CELLS D4, Q2, R2, S2. Transferring of data from CELL D4 in the fourth column to second DIO part 520d is performed over BUS 511, and second DIO part 520d provides, at its output 521, a data signal (pixel signal). Transferring of data from CELL S4 in the first column to first DIO part 502d is performed over BUS 516, and first DIO part 502d outputs, at its output 521, a data signal (pixel signal).

Arithmetic array 500d of FIG. 23 has a structure implemented by filling a blank part of the arithmetic array 500a of FIG. 15 with an identical array. Therefore, when mounted onto LSIs, chip area can be used more effectively in comparison with when the arithmetic array 500a of FIG. 15 is used. The FIG. 23 image processor further includes MPU 51d and memory 52d for, for example, the setting of coefficients to coefficient registers incorporated in each arithmetic cell 503.

In accordance with the image processor of FIG. 23, a group of CELLS A1, B1, C1, D1, B2, C2, D2, C3, D3, and D4 that are interconnected together by BUSES 531, 532, and 533 operates independently of a group of CELLS P1, Q1, R1, S1, Q2, R2, S2, R3, S3, and S4 that are likewise interconnected together by BUSES 531, 532, and 533. This allows for one of the groups to perform horizontal filter processing and for the other group to perform vertical filter processing. Additionally, external interconnecting of these twenty CELLS 503 to form a loop facilitates the formation of cyclic filters. Further, it is possible to form a cyclic filter with two of the arithmetic cells of FIG. 23 (for example, CELLS B2 and R3). The bypass busses as shown in FIG. 16 or FIG. 18 may be added to the FIG. 23 structure.

In accordance with each of the above-described embodiments of the present invention, it is possible to operate a plurality of multiply-add arithmetic cells together forming an arithmetic array for programmable image processing, in parallel. Additionally, parallel processing can be executed effectively with a smaller bus structure.

Additionally, it is possible for each of the MPUs in the above-described embodiments to be built into an arithmetic array. For example, MPU 11 shown in FIG. 1 may be designed such that it performs arithmetic and logic operations on pixel data received from data-in part 102. Further, MPU 11 may be designed such that it performs arithmetic and logic operations on data received from any one of the sixteen arithmetic cells 103. The result is fed either to any other arithmetic cell 103 or to data-out part 120.

The invention claimed is:

1. A signal processor comprising:

an arithmetic unit for performing arithmetic operations on data;

a first interface for receiving external data signals and for transmitting data corresponding to said received signals to said arithmetic unit; and a second interface for receiving data processed by said arithmetic unit and for providing data signals corresponding to said received data;

said arithmetic unit including an array of a plurality of concurrently operable arithmetic cells arranged in columns and rows wherein each of said arithmetic cells is specified by a denotation of E[x,y] where x is a column number subscript satisfying $1 \leq x \leq M$ and y is a row number subscript satisfying $x \leq y \leq M$, M being a integer such that $M \geq 2$, wherein:

an arithmetic cell, specified by E[1,y] where $1 \leq y \leq M$, receives data from said first interface;

an arithmetic cell, specified by E[x,y] where $2 \leq x \leq M$ and $x \leq y \leq M$, receives data directly from an E[x−1, y] arithmetic cell as well as directly from an E[x−1,y−1] arithmetic cell; and an E[M,M] arithmetic cell provides data to said second interface.

2. A signal processor according to claim 1, said arithmetic unit further including concurrently operable arithmetic cells that are specified by E[x,y] where $2 \leq x \leq M$ and $1 \leq y \leq x-1$, wherein:

an arithmetic cell, specified by E[x,1] where $2 \leq x \leq M$, receives data directly from an E[x−1,1] arithmetic cell;

an arithmetic cell, specified by E[x,y] where $3 \leq x \leq M$ and $2 \leq y \leq x-1$, receives data directly from an E[x−1,y] arithmetic cell as well as directly from E[x−1, y−1] arithmetic cell; and an arithmetic cell, specified by E[M,y] where $1 \leq y \leq M-1$, provides data to said second interface.

3. A signal processor according to claim 2, wherein an arithmetic cell, specified by E[x,y] where $2 \leq x \leq M$ and $1 \leq y \leq M-1$, further receives data directly from an E[x−1,y+1] arithmetic cell.

4. A signal processor according to claim 1, wherein said first interface has (M−1) data hold means for holding data, said data hold means being interconnected in a cascade fashion.

5. A signal processor according to claim 1, wherein an arithmetic cell, specified E[x,y] where $1 \leq x \leq M$ and $x \leq y \leq M$, has a multiplier ad an adder for multiply-add operation.

6. A signal processor according to claim 5, wherein said arithmetic cell, specified by E[x,y] where $1 \leq x \leq M$ and $x \leq y \leq M$, further has a coefficient register capable of being rewritten for supply of a coefficient to one of inputs of said multiplier.

7. A signal processor comprising:

an arithmetic unit for performing arithmetic operations on data; and a first and second interfaces each for receiving external data signals and for transmitting data corresponding to said received signals to said arithmetic unit, and each for receiving data processed by said arithmetic unit and for providing data signals corresponding to said received data;

said arithmetic unit including an array of a plurality of concurrently operable arithmetic cells arranged in columns and rows wherein each of said arithmetic cells in specified by a denotation of E[x,y] where x is a column number subscript satisfying $1 \leq x \leq M$, and y is a row number subscript satisfying $1 \leq y \leq M+1$, M being an integer such that $M \geq 2$, wherein:

an arithmetic cell, specified by E[1,y] where $2 \leq y \leq M+1$, receives data from said first interface;

an arithmetic cell, specified E[x,y] where $2 \leq x \leq M$ and $x+1 \leq y \leq M+1$, receives data directly from E[x−1,y] arithmetic cell as well as directly from an E[x−1,y−1] arithmetic cell;

an E[M,M+1] arithmetic cell provides data to said second interface;

an arithmetic cell, specified by E[M,y] where $1 \leq y \leq M$, receives data from said second interface;

an arithmetic cell, specified by E[x,y] where $1 \leq x \leq M-1$ and $1 \leq y \leq x$, receives data directly from an E[x+1,y] arithmetic cell as well as directly from an E[x+1,y+1] arithmetic cell; and an E[1,1] arithmetic cell provides data to said first interface.

8. A signal processor comprising:

an arithmetic unit for performing arithmetic operations on data;

a first interface for receiving external data signals and for transmitting data corresponding to said received signals to said arithmetic unit; and a second interface for receiving data processed by said arithmetic unit and for providing data signals corresponding to said received data;

said arithmetic unit including;

an array of a plurality of concurrently operable arithmetic cells arranged in columns and rows wherein each of said arithmetic cells is specified by a denotation of E[x,y] where x is a column number subscript satisfying $1 \leq x \leq M$ and y is a row number subscript satisfying $x \leq y \leq M$, M being an integer such that $M \geq 2$; and a plurality of time division multiplex common buses each of which is specified by a denotation of B[k] where k is an integer such that $1 \leq k \leq M-1$, wherein a common bus B[k] provides a path connecting an arithmetic cell specified by E[k,y] where $k \leq y \leq M$ and an arithmetic cell specified by E[k+1,y] where $k+1 \leq y \leq M$;

wherein:

an arithmetic cell, specified by E[1,y] where $1 \leq y \leq M$, receives data from said first interface;

an arithmetic cell, specified by E[k+1,y] where $k+1 \leq y \leq M$, receives data directly from an arithmetic cell, specified by E[k,y] where $k \leq y \leq M$ through said common bus B[k]; and an E[M,M] arithmetic cell provides data to said second interface.

9. A signal processor according to claim 8, said arithmetic unit further including concurrently operable-arithmetic cells that are specified by E[x,y] where $2 \leq x \leq M$ and $1 \leq y \leq x-1$ wherein:

an arithmetic cell, specified by E[k+1,y] where $1 \leq y \leq M$, receives data directly from an arithmetic cell, specified by E[k,y] where $1 \leq y \leq M$ through said common bus B[k] and an arithmetic cell, specified by E[M,y] where $1 \leq y \leq M-1$, provides data to said second interface.

10. A signal processor according to claim 8, wherein said first interface has (M−1) data hold means for holding data, said data hold means being interconnected in a cascade fashion.

11. A signal processor according to claim 8, wherein an arithmetic cell, specified by E[k+1,y] where $k+1 \leq y \leq M$, has a register capable of being rewritten and inputs data from said common bus B[k] when a value set in said register and a preassigned value agree.

12. A signal processor according to claim 8, wherein an arithmetic cell, specified by E[k+1,y] where $k+1 \leq y \leq M$, has a counter capable of counting and holding the number of clock pulses and inputs data from said common bus B[k] when a value held in said counter and a preassigned value agree.

13. A signal processor according to claim 8, wherein an arithmetic cell, specified by E[k,y] where $k \leq y \leq M$, has a register capable of being rewritten and outputs data onto said common bus B[k] when a value set in said register and a preassigned value agree.

14. 12A signal processor according to claim 8, wherein an arithmetic cell, specified by E[k,y] where $k \leq y \leq M$, has a counter capable of counting and holding the number of clock pulses and outputs data onto said common bus B[k] when a value held in said counter and a preassigned value agree.

15. A signal processor according to claim 8, wherein an arithmetic cell, specified by E[x,y] where $1 \leq x \leq M$ and $x \leq y \leq M$, has a multiplier and an adder for multiply-add operation.

16. A signal processor according to claim 15, wherein said arithmetic cell, specified by E[x,y] where $1 \leq x \leq M$ and $x \leq y \leq M$, further has a coefficient register capable of being rewritten for supply of a coefficient to one of inputs of said multiplier.

17. A signal processor according to claim 8, further comprising a bypass bus providing a path connecting said first interface and said common bus B[k] where $1 \leq k \leq M-1$.

18. A signal processor according to claim 8, further comprising, a bypass bus providing a path connecting said common bus B[k] where $1 \leq k \leq M-1$ and said second interface.

19. A signal processor according to claim 8, further comprising, a bypass bus providing a path establishing connection between at least two common buses of said plurality of time division multiplex common buses B[k] where $M \geq 3$ and $1 \leq k \leq M-1$.

20. A signal processor comprising:

an arithmetic unit for performing arithmetic operations on data; and a first and second interfaces each for receiving external data signals and for transmitting data corresponding to said received signal to said arithmetic unit, and each for receiving data processed by said arithmetic unit and for providing data signals corresponding to said received data;

said arithmetic unit including:

an array of plurality of concurrently operable arithmetic cells arranged in columns and rows wherein each of said arithmetic cells is specified by denotation of $E[x,y]$ where x is a column number subscript satisfying $1 \leq x \leq M$ and y is a row number subscript satisfying $1 \leq y \leq M+1$, M being an integer such that $M \geq 2$; and a plurality of time division multiplex common buses each of which is specified by a denotation of $B[k]$ where k is an integer such that $1 \leq k \leq M-1$, wherein a common bus b[k] provides a path connecting an arithmetic cell specified by $E[k,y]$ where $1 \leq y \leq M+1$ and an arithmetic cell specified by $E[k+1,y]$ where $1 \leq y \leq M+1$;

wherein:

an arithmetic cell, specified by $E[1,y]$ where $2 \leq y \leq M+1$, receives data from said first interface;

an arithmetic cell, specified by $E[k+1,y]$ where $k+2 \leq y \leq M+1$, receives data directly from an arithmetic cell, specified by $E[k,y]$ where $k+1 \leq y \leq M+1$ as well as directly from an arithmetic cell, specified by $E[k+1,y]$ where $1 \leq y \leq k+1$, through said common bus B[k];

an $E[M,M+1]$ arithmetic cell provides data to said second interface;

an arithmetic cell, specified by $E[M,y]$ where $1 \leq y \leq M$, receives data from said second interface;

an arithmetic cell, specified by $E[k,y]$ where $1 \leq y \leq k$, receives data directly from an arithmetic cell $E[k+1,y]$ where $1 \leq y \leq k+1$ as well as directly from an arithmetic cell $E[k,y]$ where $k+1 \leq y \leq M+1$, through said common bus B[k]; and an $E[1,1]$ arithmetic cell provides data to said first interface.

* * * * *

UNITED STATES PATENT AND TRADEMARK OFFICE
CERTIFICATE OF CORRECTION

PATENT NO. : 5,703,800
DATED : December 30, 1997
INVENTOR(S) : Kazuki NINOMIYA et al.

It is certified that error appears in the above-indentified patent and that said Letters Patent is hereby corrected as shown below:

<u>Col. 20</u>, line 63, delete "ad" and insert --and--.

Col. 22, line 30, delete "12".

Signed and Sealed this

Twenty-first Day of April, 1998

Attest:

BRUCE LEHMAN

Attesting Officer

Commissioner of Patents and Trademarks